(12) United States Patent
Chen

(10) Patent No.: US 12,552,664 B2
(45) Date of Patent: Feb. 17, 2026

(54) SELF-ALIGNED ACOUSTIC HOLE FORMATION IN PIEZOELECTRICAL MEMS MICROPHONE

(71) Applicant: Taiwan Semiconductor Manufacturing Co., Ltd., Hsinchu (TW)

(72) Inventor: Ting-Jung Chen, Kaohsiung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 663 days.

(21) Appl. No.: 17/811,109

(22) Filed: Jul. 7, 2022

(65) Prior Publication Data

US 2023/0357000 A1 Nov. 9, 2023

Related U.S. Application Data

(60) Provisional application No. 63/364,038, filed on May 3, 2022.

(51) Int. Cl.
*B81C 1/00* (2006.01)
*B81B 3/00* (2006.01)

(52) U.S. Cl.
CPC ........ *B81C 1/00158* (2013.01); *B81B 3/0021* (2013.01); *B81B 2201/0257* (2013.01); *B81B 2203/0127* (2013.01); *B81B 2203/0315* (2013.01); *B81B 2203/0353* (2013.01); *B81B 2203/04* (2013.01); *B81C 2201/0125* (2013.01); *B81C 2201/0132* (2013.01); *B81C 2201/0133* (2013.01); *B81C 2201/014* (2013.01); *B81C 2201/0176* (2013.01)

(58) Field of Classification Search
CPC ........ B81C 1/00158; B81C 2201/0132; B81C 2201/0133; B81C 2201/0176; B81B 2203/0315
See application file for complete search history.

(56) References Cited

U.S. PATENT DOCUMENTS

| | | | |
|---|---|---|---|
| 9,516,421 B1 | 12/2016 | Loeppert et al. | |
| 2016/0167946 A1 | 6/2016 | Jenkins et al. | |
| 2019/0229705 A1 | 7/2019 | Dasgupta et al. | |
| 2020/0112799 A1 | 4/2020 | Kuntzman et al. | |
| 2020/0136010 A1* | 4/2020 | Chen | H04R 17/02 |
| 2020/0411749 A1* | 12/2020 | Chen | H10N 30/09 |

FOREIGN PATENT DOCUMENTS

JP 6267787 B2 1/2018

* cited by examiner

*Primary Examiner* — Samuel A Gebremariam
(74) *Attorney, Agent, or Firm* — Slater Matsil, LLP

(57) ABSTRACT

A membrane is formed through processes including depositing a first piezoelectrical layer, depositing a first electrode layer over the first piezoelectrical layer, patterning the first electrode layer to form a first electrode, depositing a second piezoelectrical layer over the first electrode, depositing a second electrode layer over the second piezoelectrical layer, patterning the second electrode layer to form a second electrode, and depositing a third piezoelectrical layer over the second electrode. The third piezoelectrical layer, the second piezoelectrical layer, and the first piezoelectrical layer are etched to form a through-hole. The through-hole is laterally spaced apart from the first electrode and the second electrode. A first contact plug and a second contact plug are then formed to electrically connect to the first electrode and the second electrode, respectively.

19 Claims, 20 Drawing Sheets

SELF-ALIGNED ACOUSTIC HOLE FORMATION IN PIEZOELECTRICAL MEMS MICROPHONE

PRIORITY CLAIM AND CROSS-REFERENCE

This application claims the benefit of the following provisionally filed U.S. Patent application: Application No. 63/364,038, filed on May 3, 2022, and entitled "Self-Align Acoustic Hole Design in AlScN Piezo-Electrical MEMS Microphone," which application is hereby incorporated herein by reference.

BACKGROUND

Micro Electro Mechanical System (MEMS) devices often have membranes, which are flexible structures subjecting to movement. Membranes are thin enough, so that they may vibrate. In order for the membranes to vibrate, thin through-holes are formed in the membranes, so that air flow may pass through. The through-holes are designed to be small, so that air leakage is reduced.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
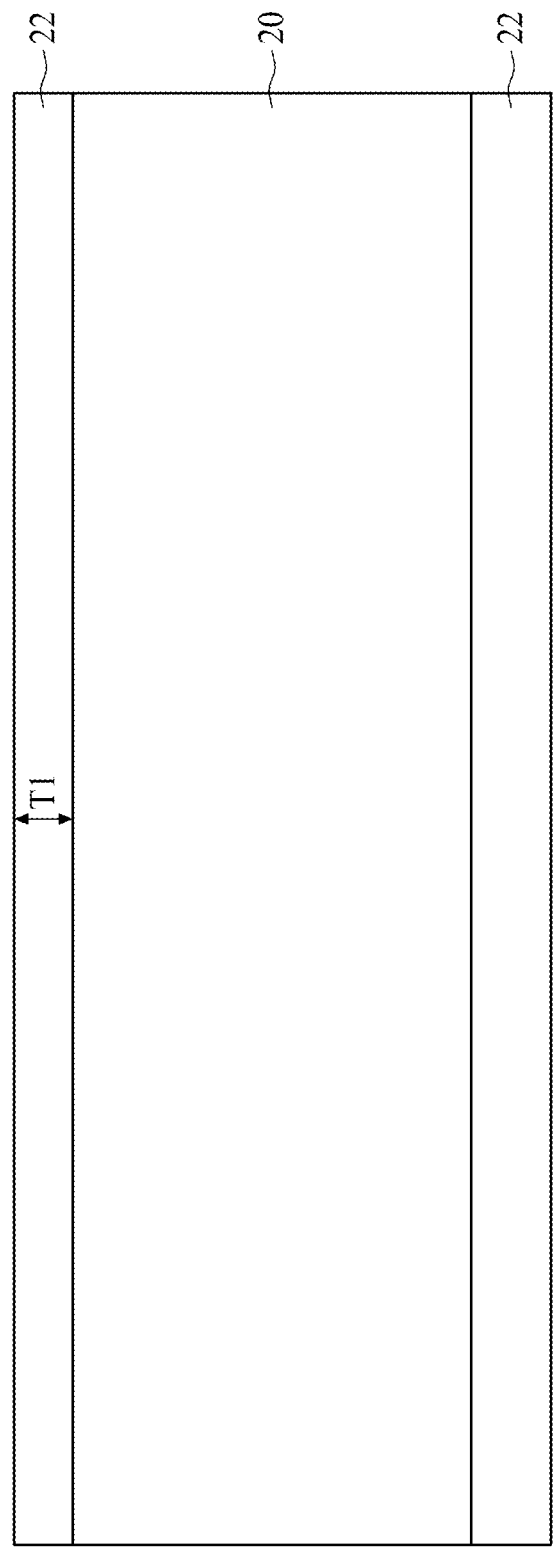
FIGS. 1 through 15 illustrate the cross-sectional views of intermediate stages in the formation of a device including a Piezoelectrical Micro Electro Mechanical System (MEMS) device in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A piezoelectrical Micro Electro Mechanical System (MEMS) device and the method of forming the same are provided. In accordance with some embodiments of the present disclosure, electrode layers (such as molybdenum layers) are formed in piezoelectric layers (such as AlScN layers). The electrode layers and the piezoelectric layers are formed alternatingly. Each of the electrode layers is patterned as an electrode before the deposition of the overlying AlScN layer. During the etching of AlScN layers to form the acoustic hole, the acoustic hole is spaced apart from the electrode layers. Accordingly, in the etching process, the homogeneous AlScN layer is etched, and hence the sidewall of the acoustic hole is smooth. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

FIGS. 1 through 15 illustrate the cross-sectional views of intermediate stages in the formation of a piezoelectrical MEMS device in accordance with some embodiments of the present disclosure. The corresponding processes are also reflected schematically in the process flow shown in FIG. 21.

Referring to FIG. 1, supporting substrate 20 is provided. In accordance with some embodiments, supporting substrate 20 comprises silicon, and may be a crystalline silicon substrate (a semiconductor substrate). In accordance with alternative embodiments, supporting substrate 20 may be formed of other materials such as silicon oxide, silicon nitride, silicon carbide, silicon oxynitride, or the like. Supporting substrate 20 may also have a single-layer structure or a multi-layer structure.

Figure 21:
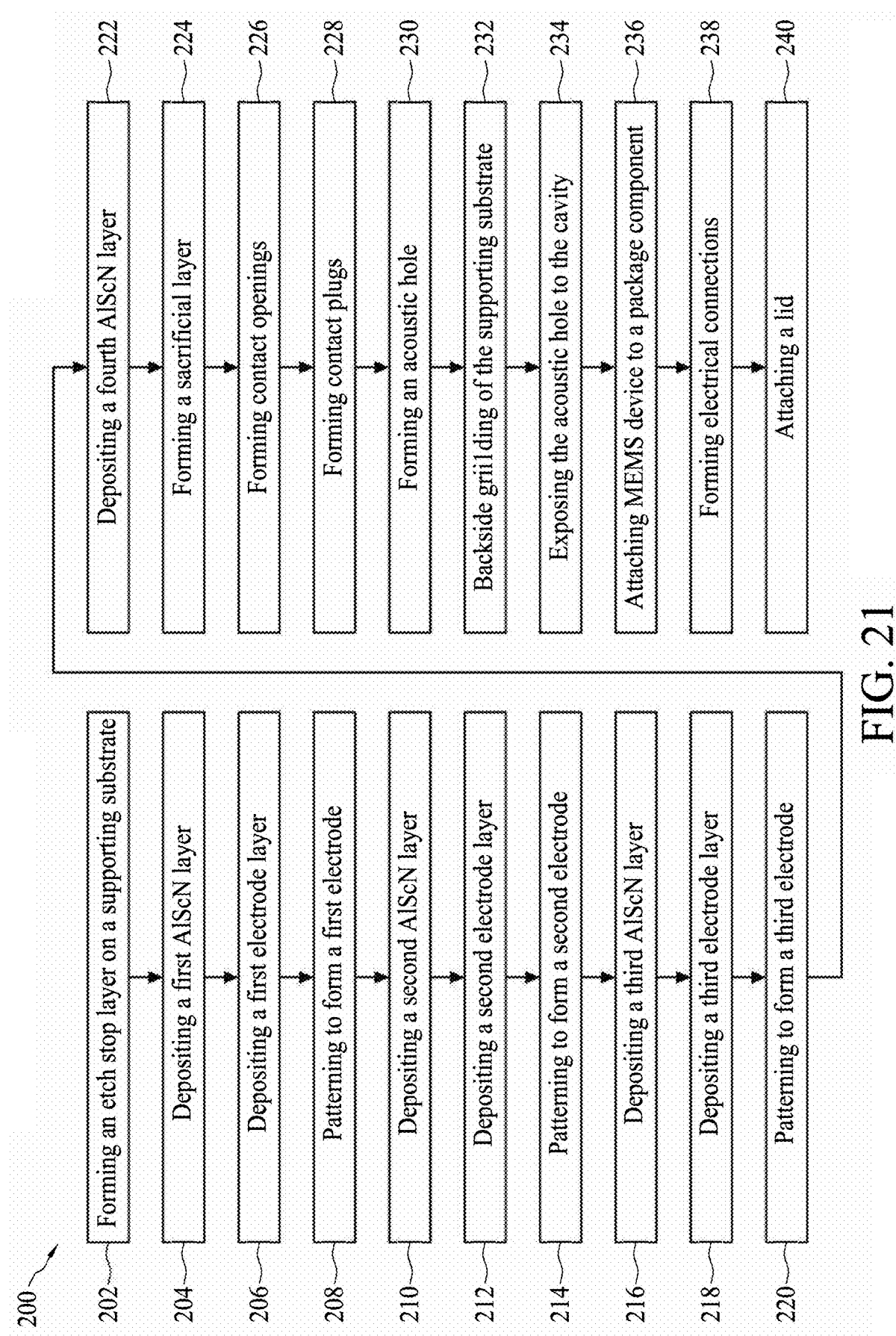
FIG. 21 illustrates a process flow for forming a piezoelectrical MEMS device in accordance with some embodiments.

In accordance with some embodiments, layer 22 is formed. Layer 22 may be used as an etch stop layer in subsequent etching processes. Accordingly, layer 22 is sometimes referred to as etch stop layer 22. The respective process is illustrated as process 202 in the process flow 200 as shown in FIG. 21. Layer 22 is formed of or comprises a material different from the material of supporting substrate 20. Layer 22 may be formed through a deposition process, an oxidation process, a nitridation process, or the like. For example, layer 22 may be formed using Chemical Vapor Deposition (CVD), Atomic Layer Deposition (ALD), Plasma Enhanced Chemical Vapor Deposition (PECVD), or the like. When supporting substrate 20 is a silicon substrate, layer 22 may also be formed through a thermal oxidation process, and the resulting layer 22 comprises silicon oxide. In accordance with alternative embodiments, layer 22 is formed through a nitridation process, and the resulting layer 22 comprises silicon nitride. The thickness T1 of layer 22 may be in the range between about 1 µm and about 5 µm. In accordance with some embodiments, the top surface of layer 22 is planarized, for example, through a Chemical Mechanical Polish (CMP) process or a mechanical polish process.

Figure 2:
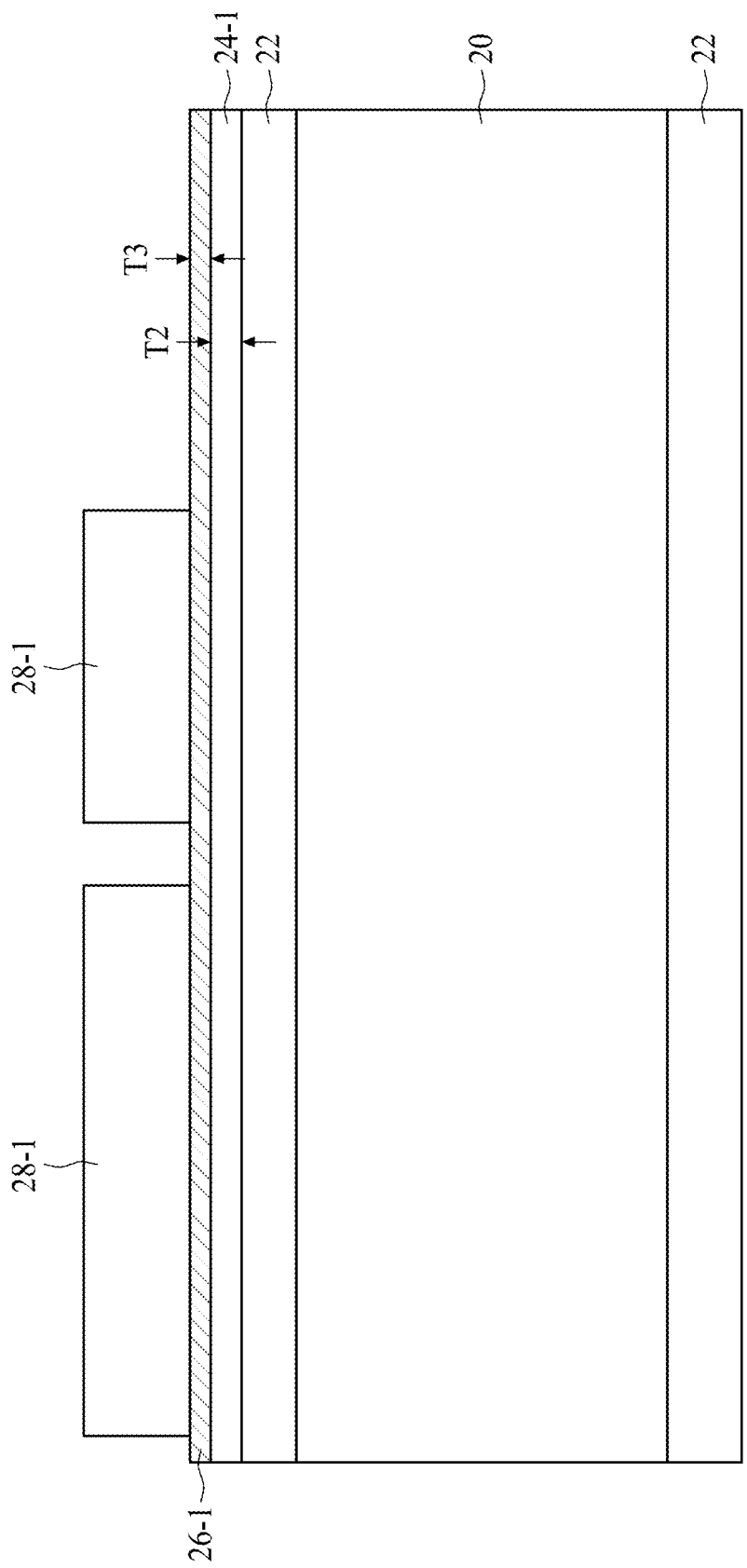

Referring to FIG. 2, piezoelectrical layer 24-1 is deposited. In accordance with some embodiments, piezoelectrical layer 24-1 comprises scandium (Sc) doped aluminum nitride (AlScN), and hence is referred to as an AlScN layer throughout the description. The respective process is illustrated as process 204 in the process flow 200 as shown in FIG. 21. Other piezoelectrical materials such as AlN, GaN, AlGaN, or the like may also be used. In accordance with some embodiments, AlScN layer 24-1 is formed through physical vapor deposition (sputtering). For example, AlSc may be used to form a target, and AlSc is sputtered from the target to deposit on layer 22. In the deposition process, nitrogen ($N_2$) may be used as a process gas, so that AlScN is deposited to form the AlScN layer 24-1. In accordance with other embodiments, other applicable deposition methods such as CVD, Metal-Organic Chemical Vapor Deposition (MOCVD), or the like may be used.

In accordance with some embodiments, process conditions are selected, so that the resulting AlScN layer 24-1 is a single crystalline layer. For example, in the deposition of AlScN layer 24-1, the temperature of supporting substrate 20 is selected to be in certain range. When the temperature is too low (such as lower than about 200° C.), amorphous AlScN or polycrystalline AlScN may be deposited, and the lattice of the subsequently formed electrode layer 26-1 cannot be aligned to the surface of AlScN layer 24-1. When the temperature is too high (such as higher than about 800° C.), the stress in AlScN layer 24-1 will be unbalanced, which causes the resulting membrane (64 in FIG. 15) to deflect or mismatch during sensing. In accordance with some embodiments, the temperature of supporting substrate 20 in the deposition of AlScN layer 24-1 may be in the range between about 200° C. and about 800° C. to form the crystalline structure. The temperature may also be in the range between about 200° C. and about 500° C. Also, the deposition rate of AlScN layer 24-1 (the increase in the thickness per unit time) may also be selected. When the deposition rate is too high, the resulting AlScN layer 24-1 may be amorphous. When the deposition rate is too low, the throughput of the manufacturing process is too low. In accordance with some embodiments, the deposition rate of supporting substrate 20 may be in the range between about 10 Å/minute and about 50 Å/minute. The thickness T2 of AlScN layer 24-1 may be in the range between about 1,000 Å and about 10,000 Å in accordance with some embodiments.

In addition, the lattice structure of AlScN is affected by the atomic percentages of Al, Sc, and N, and the lattice structure may affect the etching angles. In accordance with some embodiments, the atomic percentage of aluminum may be in the range between about 10 percent and about 45 percent, and the atomic percentage of nitrogen may be in the range between about 45 percent and about 75 percent. The atomic percentage of scandium may be in the range between about 0 percent and about 40 percent. When the atomic percentage of scandium is zero percent, the resulting layer is an AlN layer. The adjustment of the atomic percentage in AlScN layer 24-1 may be achieved by adjusting the atomic percentages of Al and Sc in the target, and by adjusting the flow rate of nitrogen.

Figure 16:
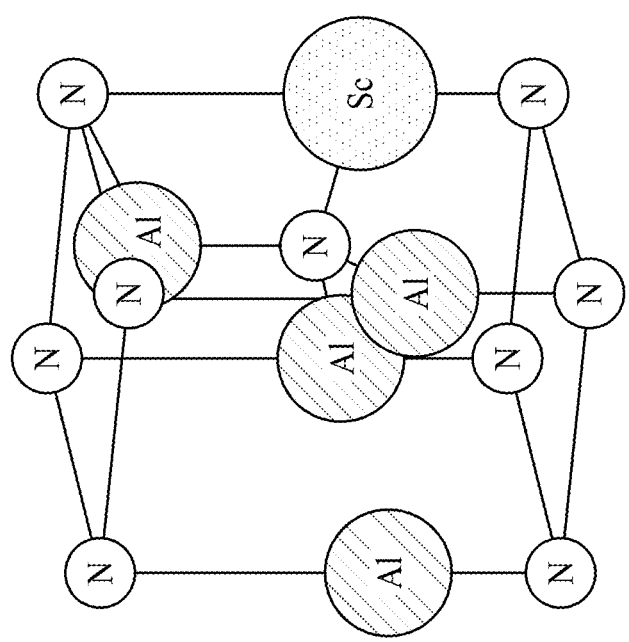
FIG. 16 illustrates a lattice structure of AlScN in accordance with some embodiments.
Figure 17:
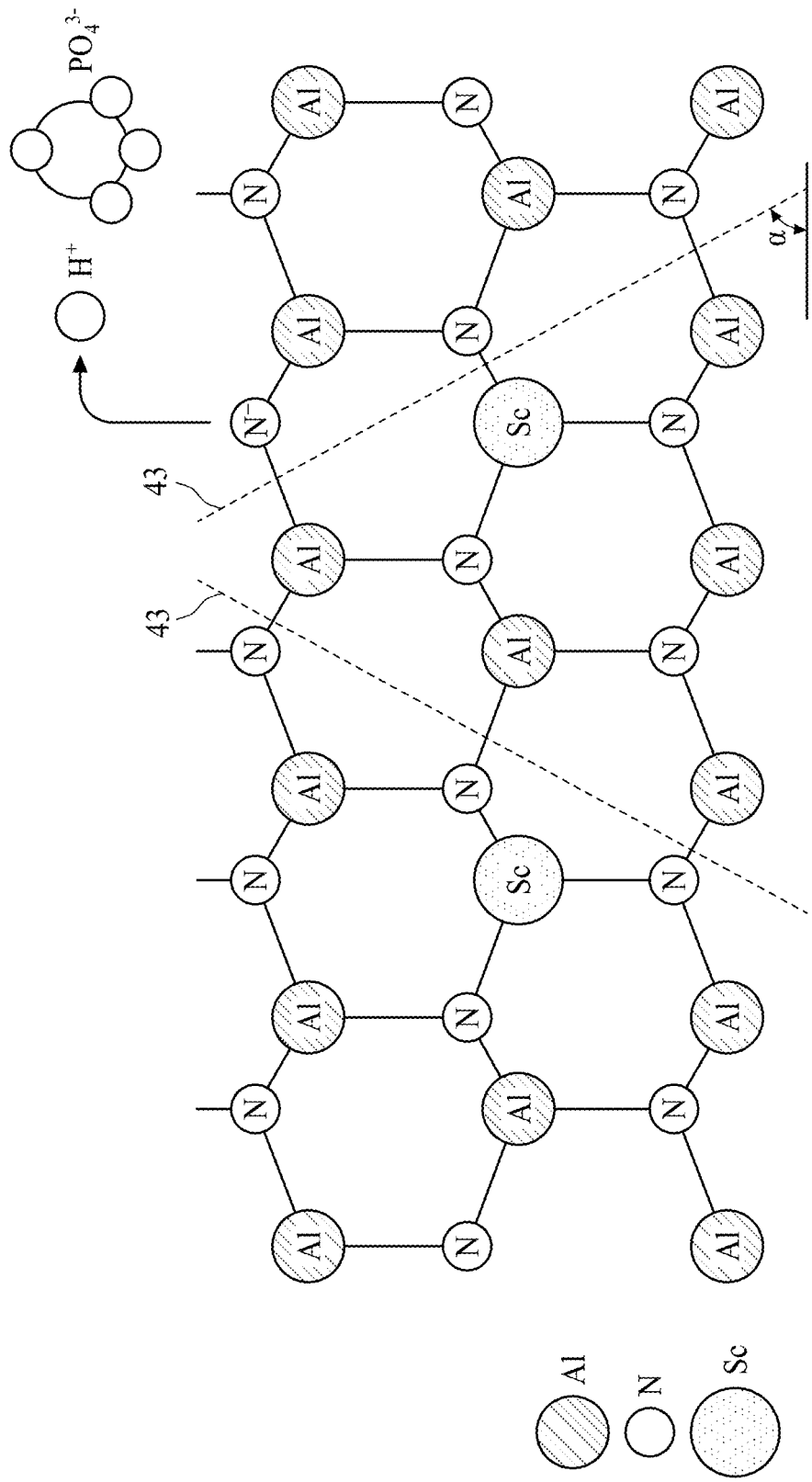
FIG. 17 illustrates the breaking of bonding between atoms in an AlScN layer in accordance with some embodiments.

FIGS. 16 and 17 illustrate the example crystalline structures of AlScN in accordance with some embodiments. The AlScN may have a wurtzite or hexagonal structure, which is utilized in the subsequent etching process to result in pointed etching with certain etching angle, as will be discussed in subsequent paragraphs.

Referring back to FIG. 2, electrode layer 26-1 is deposited on AlScN layer 24-1. The respective process is illustrated as process 206 in the process flow 200 as shown in FIG. 21. In accordance with some embodiments, the material of electrode layer 26-1 is selected so that electrode layer 26-1 may also have a lattice structure, with the lattice constant of electrode layer 26-1 being as close to the lattice constant of AlScN layer 24-1 as possible. Accordingly, in the deposition of the subsequent AlScN layer, it is easy to form the lattice structure with minimized defects. In accordance with some embodiments, electrode layer 26-1 comprises molybdenum, while other applicable materials such as Mo, Pt, Ti, and TiN, etc. may be used.

In accordance with some embodiments, electrode layer 26-1 may be formed through Physical Vapor Deposition (PVD, which may be through RF-sputtering) using a molybdenum target. Alternatively, electrode layer 26-1 may be deposited using CVD or a like deposition method. The thickness T3 of electrode layer 26-1 may be in the range between about 50 Å and about 500 Å in accordance with some embodiments.

The process conditions for depositing electrode layer 26-1 are also selected, so that electrode layer 26-1 is formed as a crystalline layer. In accordance with some embodiments, electrode layer 26-1 has a lattice constant similar to (for example, with difference smaller than about 20 percent) the lattice constant of AlScN layer 24-1. Accordingly, electrode layer 26-1 is epitaxially grown from AlScN layer 24-1. For example, when the deposition temperature for depositing electrode layer 26-1 is in the range between about 200° C. and about 500° C., the resulting electrode layer 26-1 may be crystalline. In accordance with some embodiments, to increase manufacturing throughput, the temperature for depositing electrode layer 26-1 is selected to be the same as the deposition temperature for depositing AlScN layer 24-1, so that there is no need to adjust temperature when the process transitions from depositing AlScN layer 24-1 to depositing electrode layer 26-1. Accordingly, the temperatures for depositing both of AlScN layer 24-1 and electrode layer 26-1 may be in the same range between about 200° C. and about 500° C., and may be the same as each other in accordance with some embodiments. In accordance with alternative embodiments, the temperature for depositing electrode layer 26-1 may be lower than or higher than the deposition temperature for depositing AlScN layer 24-1. Also, the deposition rate of electrode layer 26-1 is controlled not to be too high, so that the epitaxial growth may occur.

Etching mask 28-1 is then formed and patterned. In accordance with some embodiments, etching mask 28-1 comprises a photoresist. Etching mask 28-1 may be a single-layer etching mask or a multi-layer etching mask. For example, etching mask 28-1 may include a patterned photoresist, and may or may not include a Bottom Anti-Reflective Coating (BARC) under the patterned photoresist. Etching mask 28-1 also may or may not include a middle layer between the bottom layer and the patterned photoresist. In accordance with some embodiments, the top view of the etching mask 28-1 may be similar to the pattern shown in FIG. 20, wherein etching mask 28-1 has a rectangular (such as a square) top-view shape, with an X-shaped opening therein.

Figure 3:
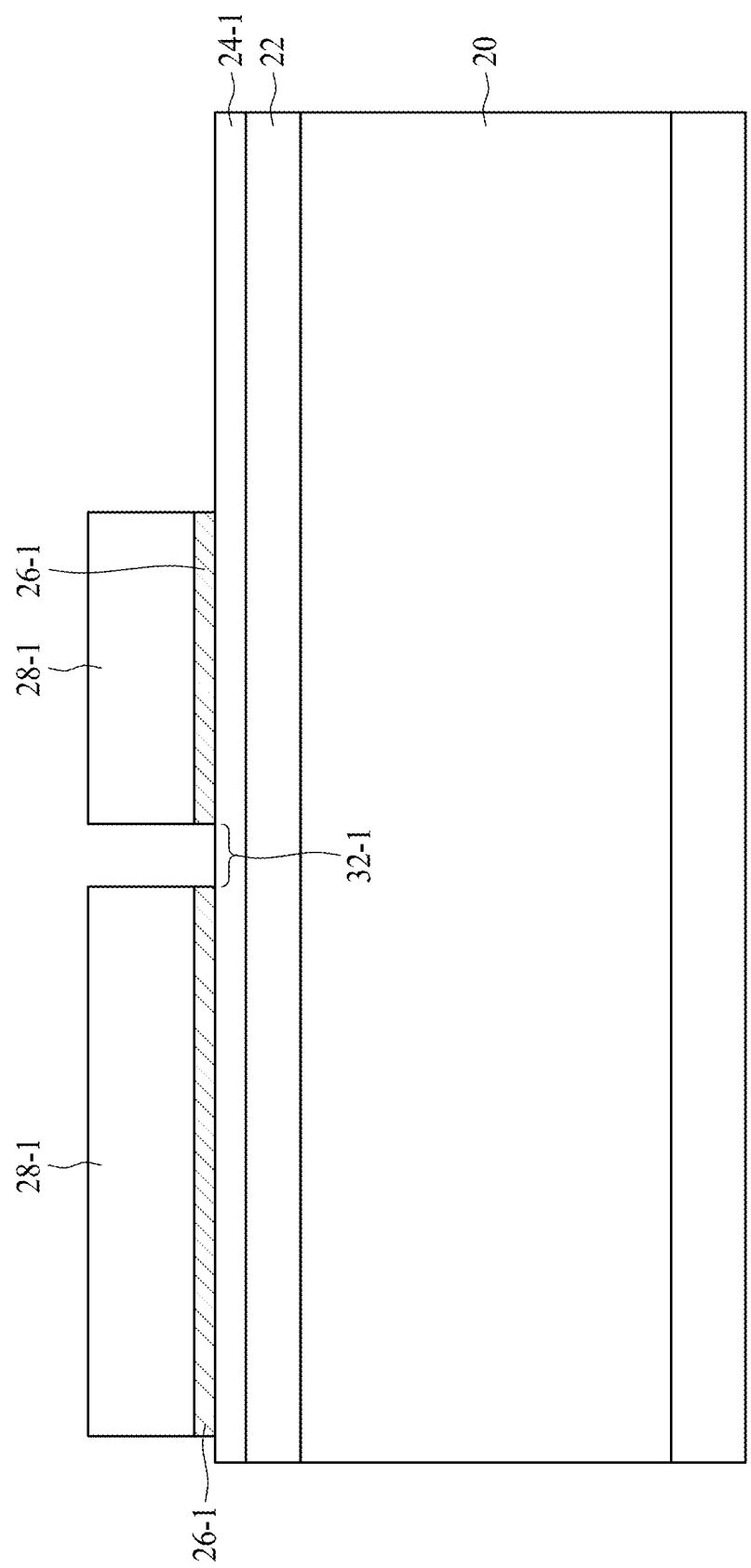

Next, as shown in FIG. 3, electrode layer 26-1 is patterned in an etching process, wherein etching mask 28-1 is used to define the patterns of the remaining portion of electrode layer, which remaining portion is also referred to as (bottom) electrode 26-1. The respective process is illustrated as process 208 in the process flow 200 as shown in FIG. 21. In accordance with some embodiments, the etching of electrode layer 26-1 may be performed through a dry etching process, for example, through Reactive Ion Etching (RIE). The etching gas may include a fluorine-containing gas such as $SF_6$, $CHF_3$, $CF_4$, HF, or the like, or combinations thereof. The etching process may be performed at a temperature in the range between about 200° C. and about 275° C. In accordance with alternative embodiments, electrode layer 26-1 is etched using $XeF_2$ vapor, and a room temperature. In accordance with yet alternative embodiments, wet etching may be performed, wherein etching chemicals including KOH, $HNO_3$, and the like may be used, which may use $H_2O$ as a solvent. Hydrogen peroxide ($H_2O_2$) may also be used. The etching gas/chemical solution is selected, so that AlScN layer 24-1 is used as an etch stop layer. After the etching process, etching mask 28-1 is removed.

Figure 20:
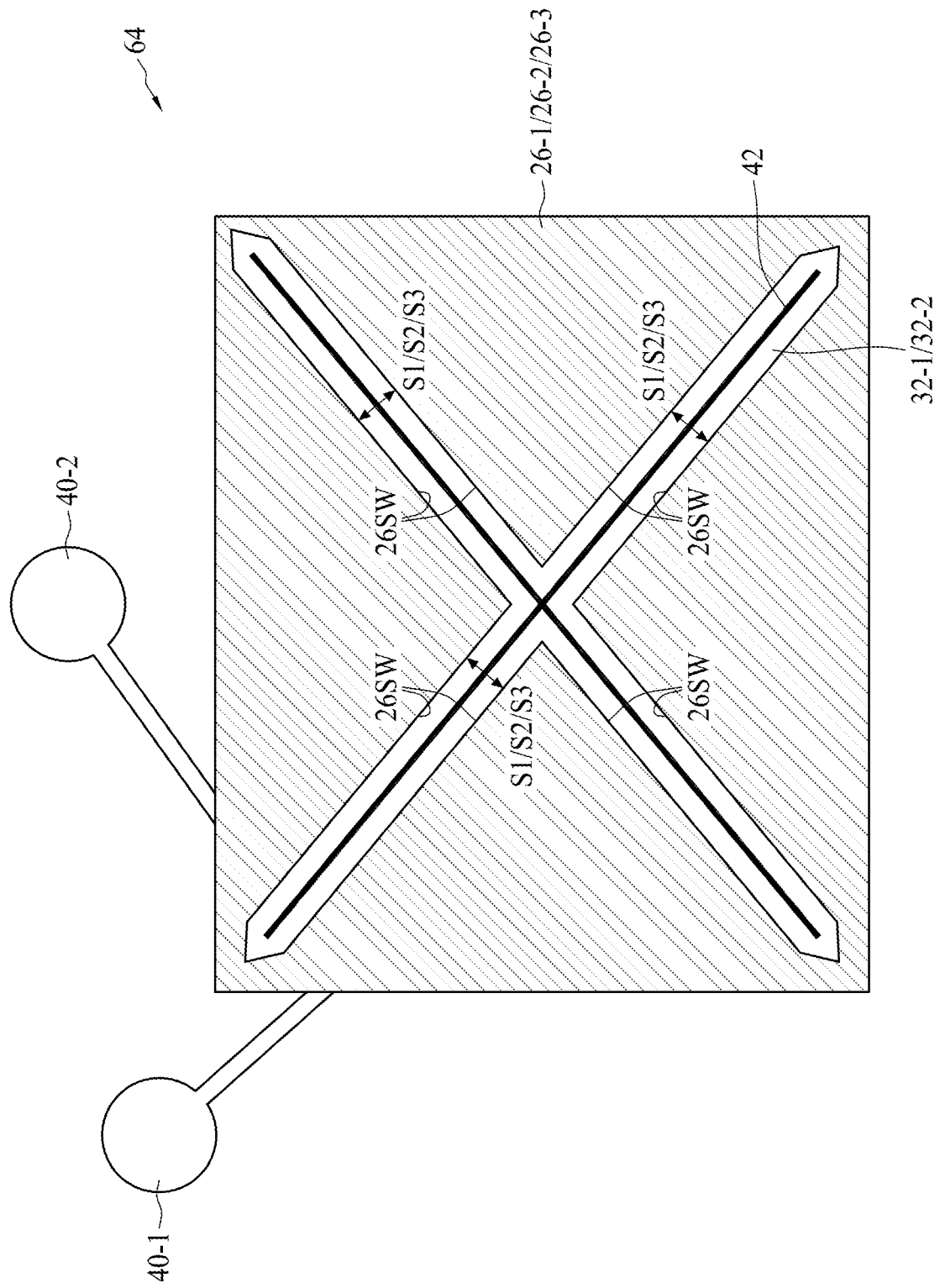
FIG. 20 illustrates a top view of a piezoelectrical MEMS device in accordance with some embodiments.

An example top view of electrode 26-1 is shown in FIG. 20. Electrode 26-1 has opening 32-1, which may have the shape of "X" in the top view.

Figure 4:
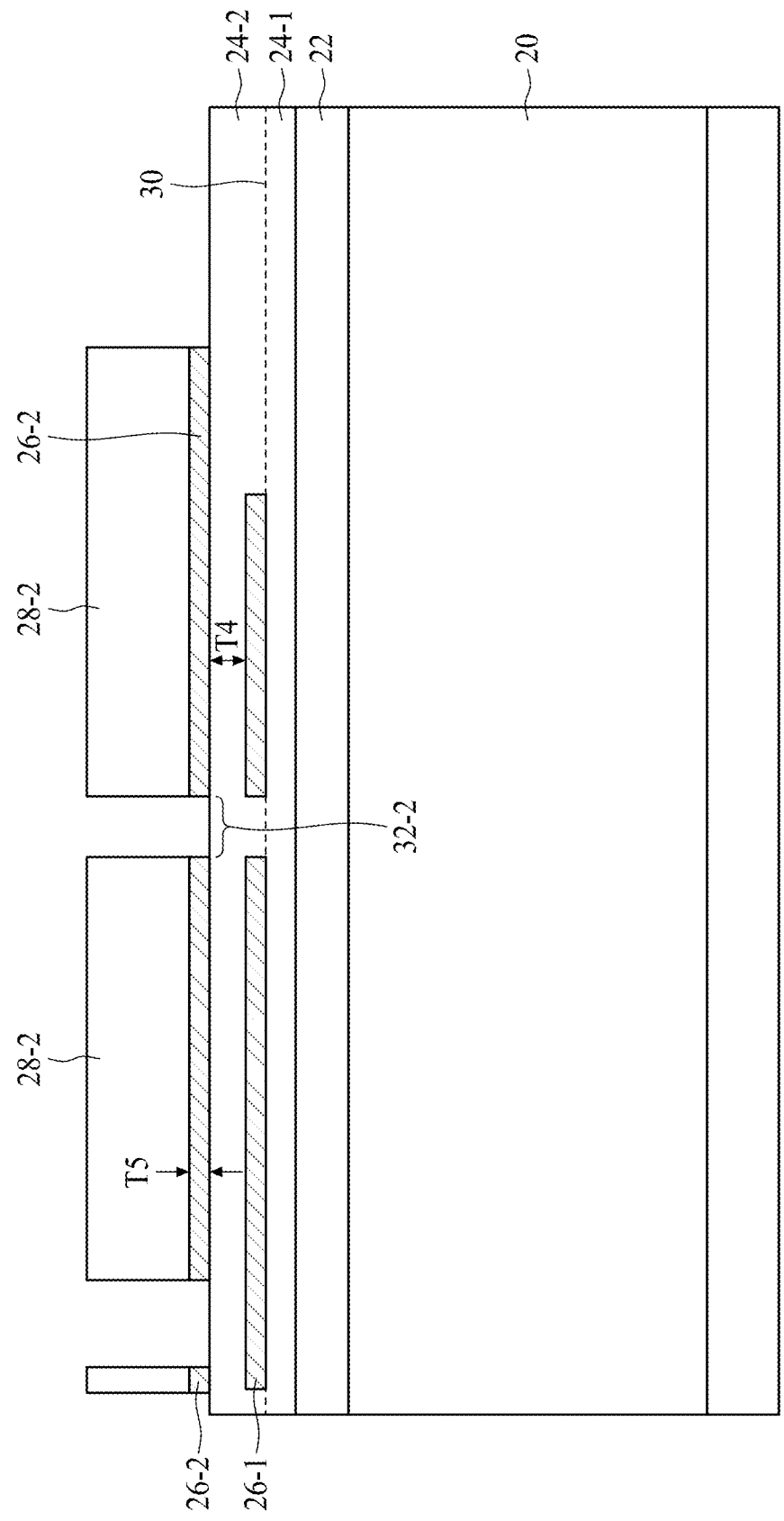

FIG. 4 illustrates the deposition of piezoelectrical layer 24-2. The respective process is illustrated as process 210 in the process flow 200 as shown in FIG. 21. In accordance with some embodiments, piezoelectrical layer 24-2 is or comprises AlScN or AlN. Furthermore, the material of piezoelectrical layer 24-2 may be the same as, for different from, the material of piezoelectrical layer 24-1. For example, when piezoelectrical layer 24-1 comprises AlScN, piezoelectrical layer 24-2 may comprise AlScN, with the atomic percentages of Al, Sc, and N in piezoelectrical layer 24-2 being the same as the corresponding atomic percentages of Al, Sc, and N in piezoelectrical layer 24-1. In another example, when piezoelectrical layer 24-1 comprises AlScN, piezoelectrical layer 24-2 may comprise AlN or AlScN, with the atomic percentages of Al, Sc, and N in piezoelectrical layer 24-2 being different from the corresponding atomic percentages of Al, Sc, and N in piezoelectrical layer 24-1. In accordance with some embodiments, piezoelectrical layer 24-2 is also referred to as AlScN layer 24-2 throughout the description. In accordance with some embodiments, the thickness T4 of AlScN layer 24-2 may be in the range between about 1,000 Å and about 10,000 Å.

In accordance with some embodiments, after the deposition of AlScN layer 24-2, a planarization process such as a Chemical Mechanical Polish (CMP) process is performed to level the top surface of AlScN layer 24-2. In accordance with alternative embodiments, no planarization process is performed after AlScN layer 24-2 is deposited.

Since both of AlScN layer 24-1 and electrode 26-1 may be crystalline layers having lattice structures, AlScN layer 24-2 may be epitaxially grown from both of AlScN layer 24-1 and electrode 26-1. The process conditions may also be adjusted to ensure the occurrence of the epitaxy. For example, the deposition rate of electrode layer 26-1 is controlled not to be too high, so that the epitaxial growth may occur. In accordance with some embodiments, the temperature for depositing AlScN layer 24-2 is the same as the deposition temperature for depositing AlScN layer 24-1 and electrode layer 26-2. In accordance with alternative embodiments, the temperature for depositing AlScN layer 24-2 may be lower than or higher than the deposition temperature for depositing either one of AlScN layer 24-1 and electrode layer 26-2.

In FIG. 4, a dashed line 30 is drawn to show where AlScN layer 24-2 is joined to AlScN layer 24-1, wherein the joining position may be at the same level as the bottom surface of electrode layer 26-2. It is appreciated that since AlScN layer 24-2 is epitaxially grown from AlScN layer 24-1, there may not be a distinguishable interface at the illustrated position, especially when AlScN layer 24-1 and AlScN layer 24-2 have the same composition (same percentages of Al, Sc, and N). Conversely, when AlScN layer 24-1 and AlScN layer 24-2 have different compositions, AlScN layer 24-1 and AlScN layer 24-2 may be distinguishable from each other, and distinguishable interface 30 may be observed. For example, with a first one of the AlScN layer 24-1 and AlScN layer 24-2 including an element (such as Al) that is not in a second one of the AlScN layer 24-1 and AlScN layer 24-2, AlScN layer 24-1 and AlScN layer 24-2 may be distinguishable from each other by detecting the distribution of the element.

Further referring to FIG. 4, electrode layer 26-2 is formed. The respective process is illustrated as process 212 in the process flow 200 as shown in FIG. 21. In accordance with some embodiments, the material of electrode layer 26-1 is selected so that electrode layer 26-2 may also have a lattice structure. In addition, the lattice constant of electrode layer 26-2 may be as close to the lattice constant of AlScN layer 24-2 as possible, so that in the deposition of the subsequent AlScN layer, it is easy to form the lattice structure with minimized defects. In accordance with some embodiments, electrode layer 26-2 comprises molybdenum or other applicable material that have close lattice constant as AlScN.

In accordance with some embodiments, electrode layer 26-2 may be formed through PVD, CVD, or the like. The thickness T5 of electrode layer 26-2 may be in the range between about 50 Å and about 500 Å in accordance with some embodiments.

The process conditions for depositing electrode layer 26-2 are also selected, so that electrode layer 26-2 is formed as a single crystalline layer. In accordance with some embodiments, electrode layer 26-2 has a lattice constant similar to the lattice constant of AlScN layer 24-2, and hence is epitaxially grown from AlScN layer 24-2. For example, the deposition rate of electrode layer 26-1 is controlled to be not too high, so that the epitaxial growth may occur. In accordance with some embodiments, the temperature for depositing electrode layer 26-2 is the same as the deposition temperature for depositing AlScN layer 24-2. In accordance with alternative embodiments, the temperature for depositing electrode layer 26-2 may be lower than or higher than the deposition temperature for depositing AlScN layer 24-2.

Etching mask 28-2 is then formed and patterned. In accordance with some embodiments, etching mask 28-2 comprises a photoresist. Etching mask 28-2 may be a single-layer etching mask, a double-layer etching mask, or a tri-layer etching mask. In accordance with some embodiments, the top view of the etching mask 28-2 may be similar to the pattern shown in FIG. 20, wherein etching mask 28-2 has a rectangular (such as a square) top-view shape, with openings 32-2 being formed in the rectangle. Openings 32-2 may also have an "X" top-view shape.

Next, electrode layer 26-2 is patterned in an etching process, wherein etching mask 28-2 is used to define the patterns of the remaining electrode, which is also referred to as (middle) electrode 26-2. The respective process is illustrated as process 214 in the process flow 200 as shown in FIG. 21. The etching process may be selected from the same group of candidate processes for etching electrode layer 26-1, and hence the details are not repeated herein. The etching gas/chemical solution is selected, so that AlScN layer 24-2 is used as an etch stop layer. After the etching process, etching mask 28-2 is removed. The remaining structure is shown in FIG. 5.

An example top view of electrode 26-2 is shown in FIG. 20. Electrode 26-2 has opening 32-2, which may have the shape of "X" in the top view. The opening 32-2 also overlaps opening 32-1 in electrode 26-1 at least partially, or may be fully. Electrode 26-2 has at least one (or more) portion extending beyond the edge of the underlying electrode 26-1, which extension portion is used for forming contact plug.

Figure 5:
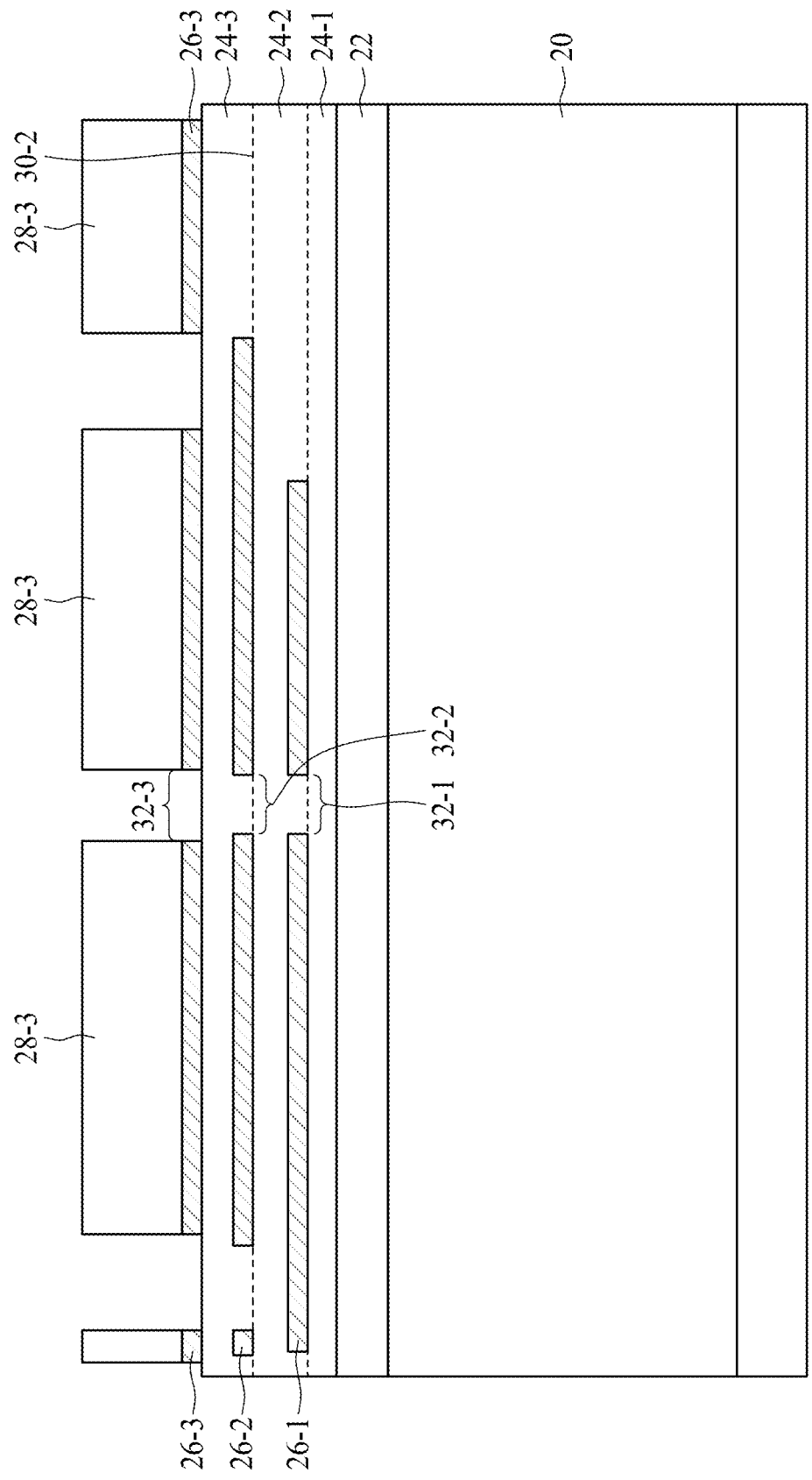

FIG. 5 further illustrates the formation of piezoelectrical layer 24-3 (also refer to as an AlScN layer) and electrode 26-3 in accordance with some embodiments. The respective processes are illustrated as processes 216, 218, and 220 in the process flow 200 as shown in FIG. 21. The materials, the formation processes, and the thicknesses of AlScN layer 24-3 and electrode 26-3 may be selected from the same groups of candidate materials, formation processes, and thicknesses of the underlying AlScN layers 24-1 and 24-2 and electrodes 26-1 and 26-2, respectively. The details are thus not repeated herein. In accordance with some embodiments, piezoelectrical layers 24-3 includes openings 32-3, which overlap the underlying openings 32-2 in electrode 26-2 and openings 32-1 in electrode 26-1. Furthermore, as shown in FIG. 20, openings 32-1, 32-2, and 32-3 are aligned at least partially. Alternatively, openings 32-1, 32-2, and 32-3 are fully aligned, with the corresponding edges of electrodes 26-1, 26-2, and 26-3 vertically aligned with each other.

In accordance with some embodiments, AlScN layer 24-3 and electrode 26-3 are epitaxially grown, and may have the same or similar lattice constants as the underlying AlScN layers 24-1 and 24-2 and electrodes 26-1 and 26-2. Dashed line 30-2 is shown to mark where AlScN layer 24-3 joins the underlying AlScN layer 24-2. Due to the epitaxy of AlScN layers 24-2 and 24-3, the joining line 32 between AlScN layers 24-2 and 24-3 may be distinguishable as a distinguishable interface, or may not be distinguishable.

Figure 6:
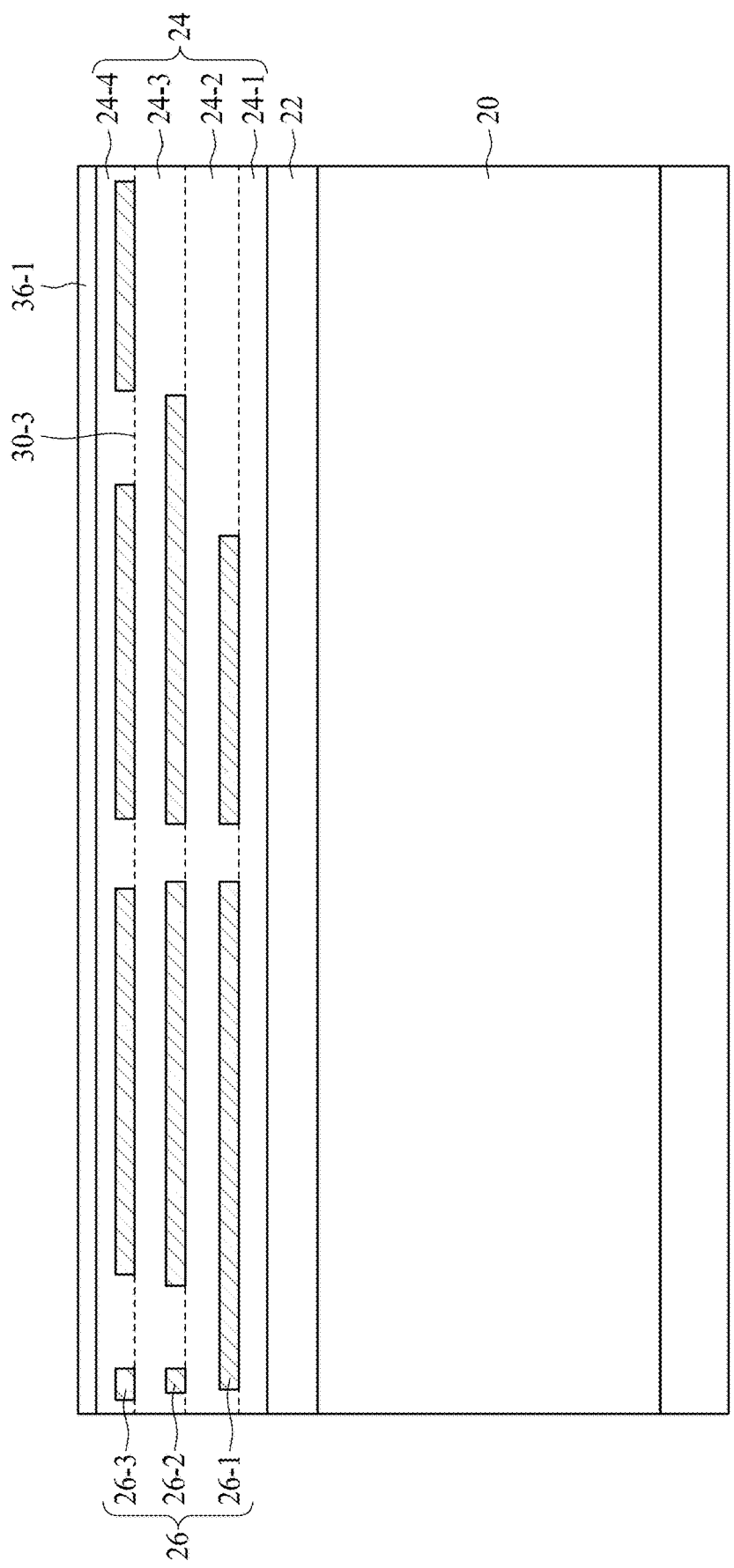

FIG. 6 illustrates the formation of piezoelectrical layer 24-4 (also refer to as an AlScN layer) in accordance with some embodiments. The respective process is illustrated as process 222 in the process flow 200 as shown in FIG. 21. The materials, the formation processes, and the thicknesses of AlScN layer 24-4 may be selected from the same groups of candidate materials, formation processes, and thicknesses of the underlying AlScN layers 24-1, 24-2, and 24-3. AlScN layer 24-4 is formed as a blanket layer fully covering electrode 26-3. A planarization process may be (or may not be) performed to planarize the top surface of AlScN layer 24-4.

In accordance with some embodiments, AlScN layer 24-4 is epitaxially grown, and may have the same or similar lattice constant as the underlying AlScN layer 24-3. Accordingly, dashed line 30-3 is shown to mark where AlScN layer 24-4 joins the underlying AlScN layer 24-3. Due to the epitaxy of AlScN layer 24-3 and 24-4, the interface between AlScN layers 24-3 and 24-4 may or may not be distinguishable.

In accordance with some embodiments, AlScN layers 24-1, 24-2, 24-3, and 24-4 are formed of the same material such as AlScN, AlN, or the like. Furthermore, the compositions (the elements and the corresponding atomic percentages of the elements) of AlScN layers 24-1, 24-2, 24-3, and 24-4 may be the same as each other (although some of them may be different from each other). Accordingly, due to the epitaxy process and the lattice structure, AlScN layers 24-1, 24-2, 24-3, and 24-4 may collectively form a homogenous layer having a uniform composition, with no distinguishable interface in between. Throughout the description, AlScN layers 24-1, 24-2, 24-3, and 24-4 are individually and collectively referred to as AlScN layers 24. Electrodes 26-1, 26-2, and 26-3 are also individually and collectively referred to as electrodes 26.

FIG. 6 further illustrates the formation of sacrificial layer 36-1 over AlScN layer 24-4, wherein sacrificial layer 36 is formed to help the formation of contact plugs in subsequent processes. The respective process is illustrated as process 224 in the process flow 200 as shown in FIG. 21. In accordance with some embodiments, sacrificial layer 36-1 is formed of a material having a high etching selectivity relative to the etching of AlScN layers, so that in the subsequent process, sacrificial layer 36-1 may be selectively removed without damaging AlScN layer 24-4. In accordance with some embodiments, sacrificial layer 36-1 comprises silicon oxide, silicon carbide, silicon oxycarbide, or the like.

Figure 7:
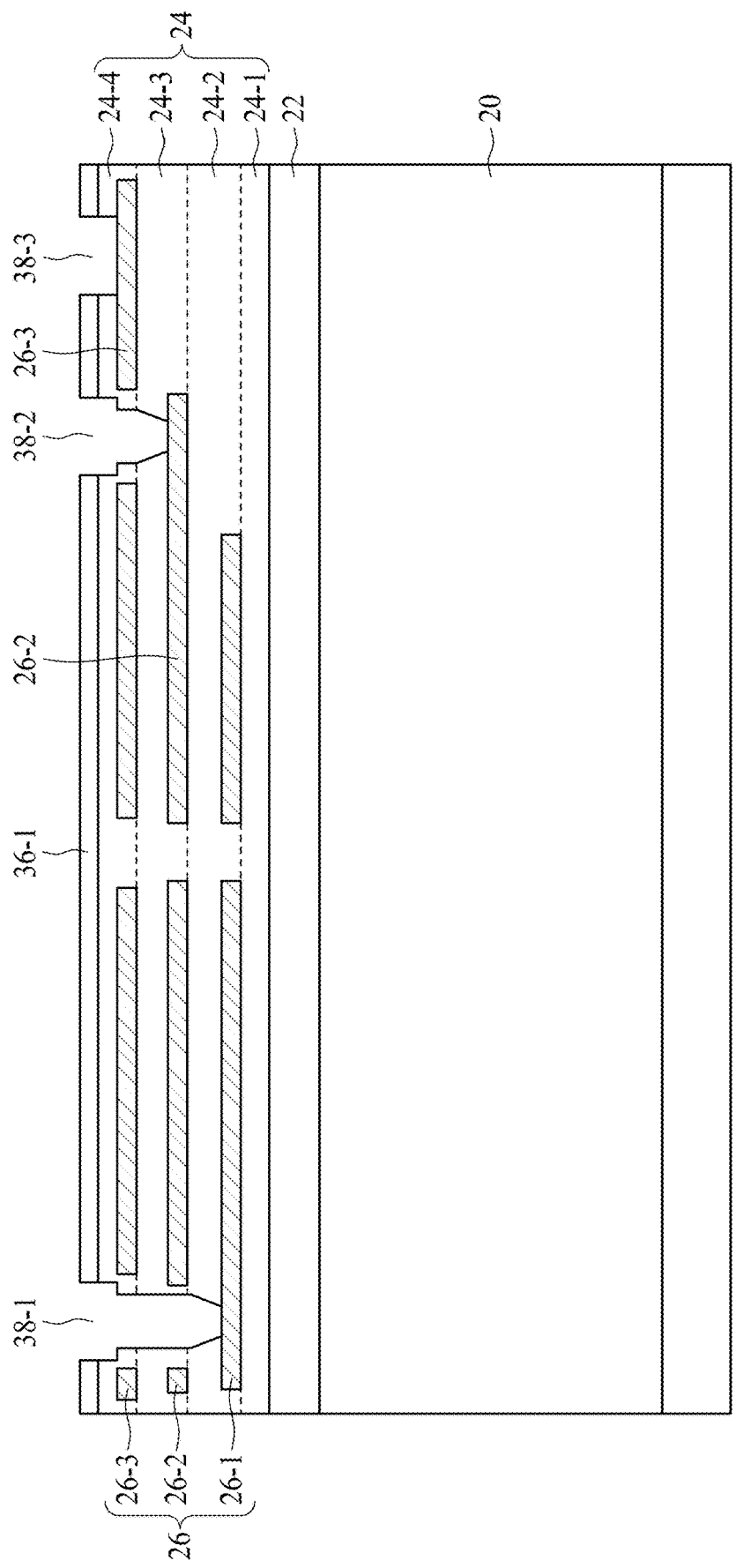

Referring to FIG. 7, contact openings 38-1, 38-2, and 38-3 are formed. The respective process is illustrated as process 226 in the process flow 200 as shown in FIG. 21. In accordance with some embodiments, the formation of contact openings 38-1, 38-2, and 38-3 may include etching sacrificial layer 36 and AlScN layers 24-2, 24-3, and 24-4, for example, through an anisotropic etching process. The etching is stopped by electrodes 26-1, 26-2, and 26-3, which function as etch stop layers. In accordance with some embodiments, AlScN layers 24 are etched using $H_3PO_4$, wherein a wet etching process is used. Similar to the etching for forming through-hole 42 (FIG. 9), the wet etching may also form straight and slant edges for openings 38-1, 38-2, and 38-3 without causing side-etching. In accordance with other embodiments, AlScN layers 24 may also be etched through dry etching processes.

Figure 8:
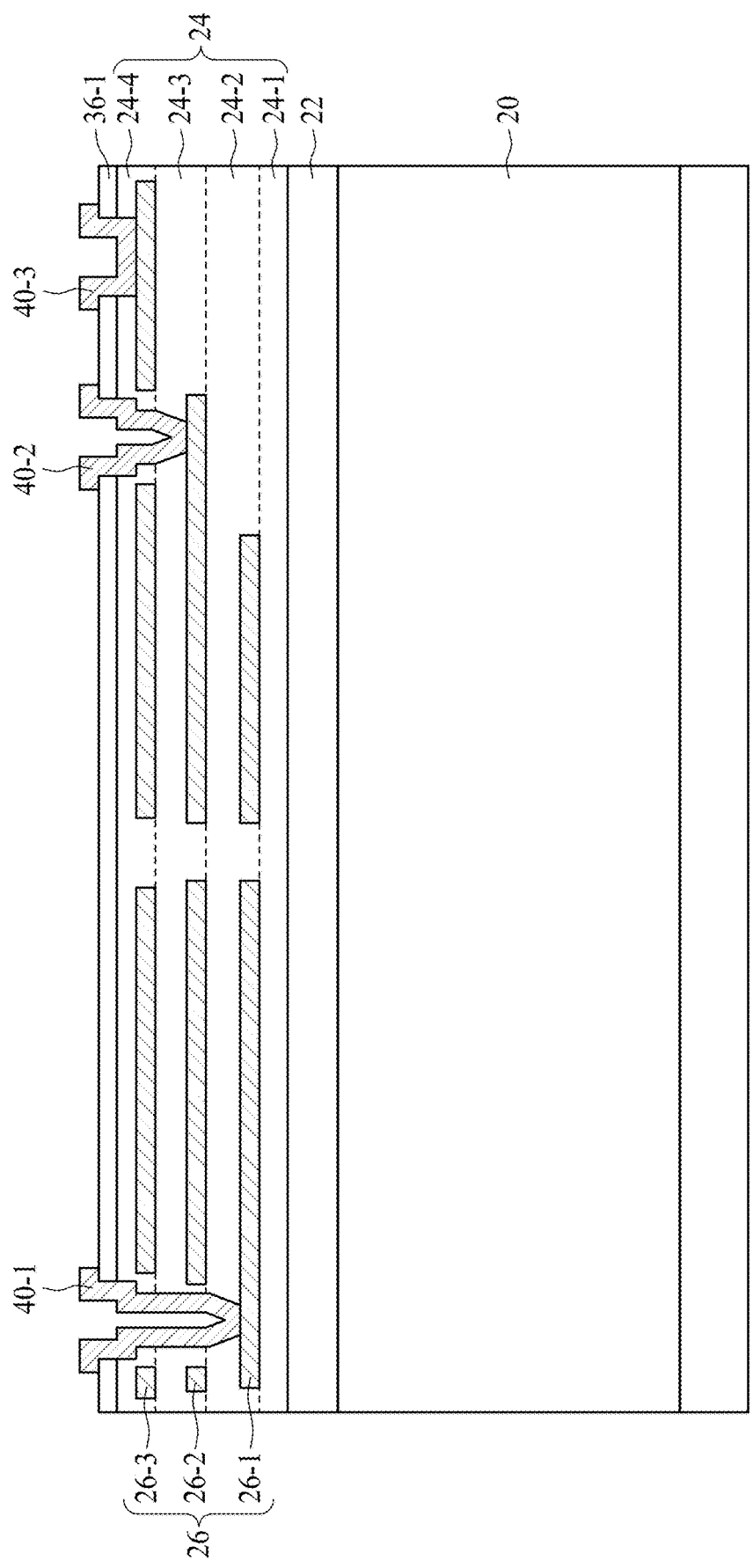

FIG. 8 illustrates the formation of contact plugs 40-1, 40-2, and 40-3, which extend into contact openings 38-1, 38-2, and 38-3, respectively, to contact electrodes 26-1, 26-2, and 26-3, respectively. The respective process is illustrated as process 228 in the process flow 200 as shown in FIG. 21. In accordance with some embodiments, contact plugs 40-1, 40-2, and 40-3 are formed of a metal layer, which may be formed of or comprise aluminum copper (AlCu), aluminum, nickel, palladium, alloys thereof, and/or combinations thereof. The formation process may include a conformal deposition process followed by a patterning process. The patterning process may be performed by forming an etching mask to define patterns, and then etching the conformal metal layer.

In accordance with some embodiments, an insulating dielectric layer (not shown) is formed to encircle each of contact plugs 40-1, 40-2, and 40-3, and to physically and electrically insulate contact plugs 40-1, 40-2, and 40-3 from AlScN layers 24-2, 24-3, and 24-4. The insulating dielectric layer is formed of a dielectric layer. The insulating dielectric layers (when formed) may prevent the contact plugs 40-1, 40-2, and 40-3 from electrically connecting to AlScN layers 24 directly. In accordance with alternative embodiments, no insulating dielectric layer is formed.

Figure 9:
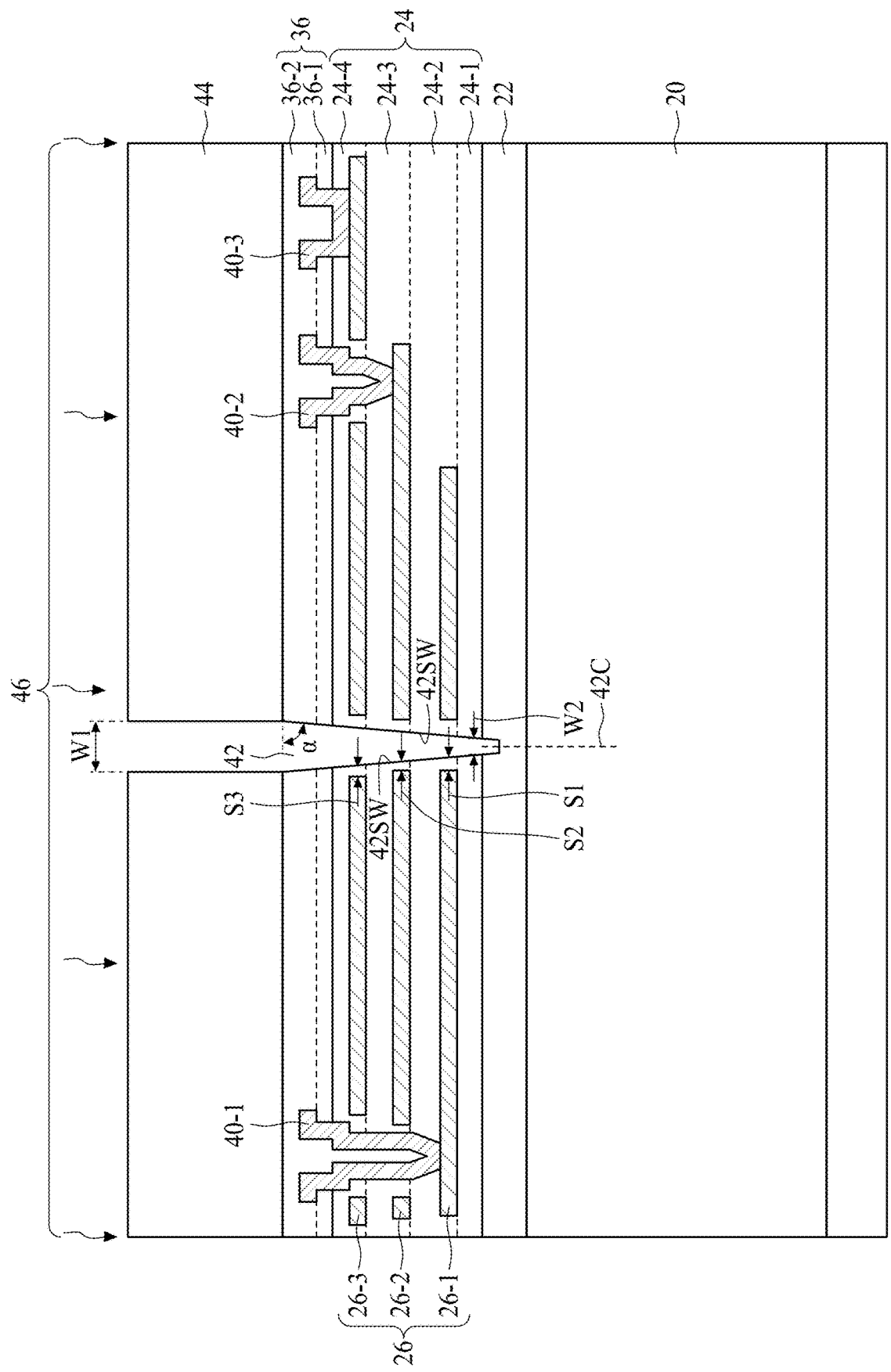

Next, referring to FIG. 9, a sacrificial layer 36-2 is deposited to cover contact plugs 40-1, 40-2, and 40-3. In accordance with some embodiments, sacrificial layer 36-2 is formed of a same material as sacrificial layer 36-1. For example, both of sacrificial layers 36-1 and 36-2 may be formed of or comprises silicon oxide. Throughout the description, sacrificial layers 36-1 and 36-2 may be collectively and individually referred to as sacrificial layer 36.

FIG. 9 further illustrates the formation of through-hole 42, which penetrates through sacrificial layer 36 and AlScN layers 24. Through-hole 42 is also referred to as acoustic hole 42 since it allows air flow to pass through when the resulting microphone is subject to a sound wave. The respective process is illustrated as process 230 in the process flow 200 as shown in FIG. 21. The etching may be stopped on layer 22, which acts as the etch stop layer for the etching process.

In accordance with some embodiments, to perform the etching process, a patterned etching mask 44 is formed, which may comprise a photoresist, and may be a single-layer etching mask, a double-layer etching mask, a tri-layer etching mask, or the like. Next, sacrificial layer 36 is etched, so that AlScN layers 24-4 is exposed. The etching may be performed through a dry etching process, which may be anisotropic. The etching gas may include the mixture of $NF_3$ and $NH_3$, the mixture of HF and $NH_3$, or the like.

Next, an etching process 46 is performed to etch AlScN layers 24, so that acoustic hole 42 is formed. In accordance with some embodiments, the etching process 46 is performed through a wet etching process, while an isotropic dry etching process may also be performed.

In accordance with some embodiments, etching process 46 may be performed using a phosphoric acid ($H_3PO_4$) solution, which is dissolved in water. In accordance with some embodiments, the etching chemical may include about 60 percent to about 95 percent $H_3PO_4$. The temperature of the etching solution is elevated to be higher about 100° C. Otherwise, the azeotrope effect of $H_3PO_4$ and $H_2O$ is reduced, and the etching chemical may not be able to etch AlScN. In accordance with some embodiments, the temperature of the etching solution is in the range between about 100° C. and about 150° C. In the etching, ions $Al^{3+}$, $Ac^{3+}$, $OH^-$, and $NH^{4+}$ are generated, which are all soluble in the etching solution, and can be removed along with the etching solution.

Referring to FIG. 17, AlScN layers 24 have point defect sites, which may be the Al—N bonds and Sc—N bonds. $H_3PO_4$ solution reacts with the point defect sites to break the Al—N bonds and Sc—N bonds, which results in the etching of AlScN layers 24. For example, the illustrated bonds Al—N and Sc—N along dashed lines 43 are broken, and the sidewalls of AlScN layers 24 (FIG. 19) facing the resulting acoustic hole 42 are straight and smooth. The resulting sidewalls of AlScN layers 24 have tilt angle α (shown in FIG. 17, also shown in FIG. 9) in the range between about 57 degrees and about 63 degrees. The tilt angle α may also be equal to about 58.9 degrees in accordance with some embodiments.

Figure 19:
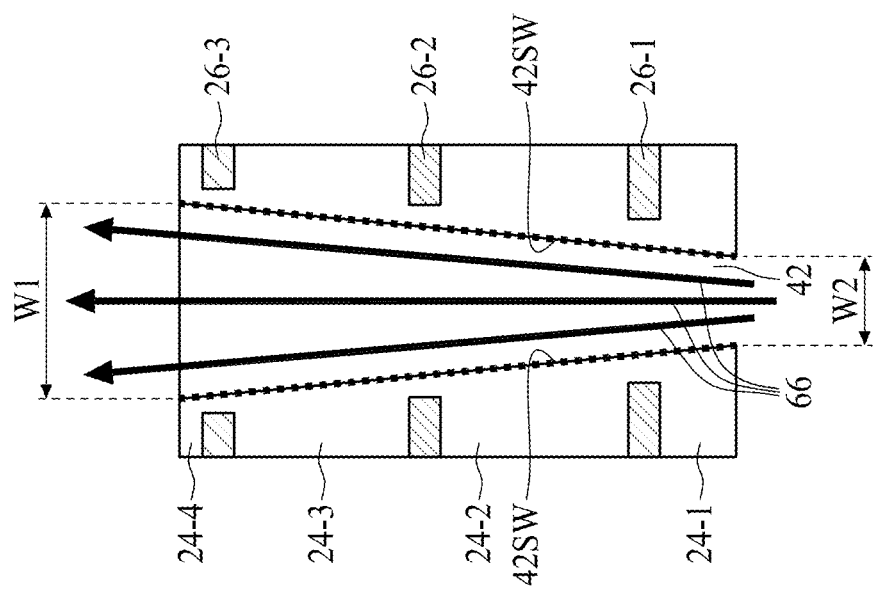
FIGS. 18 and 19 illustrate the comparison of air flow profiles in different piezoelectrical MEMS devices in accordance with some embodiments.

Due to the lattice structure of AlScN layers 24, the point defect sites are arranged regularly in a repeated pattern. Accordingly, as shown in FIGS. 9 and 19, the slanted sidewalls 42SW of AlScN layers 24 facing the resulting acoustic hole 42 are straight and smooth. The size of the opening in patterned etching mask 44 is selected, so that none of the electrodes 26-1, 26-2, and 26-3 are exposed to acoustic hole 42. Furthermore, with the tilt angle α being known and fixed, the top width W1 (FIG. 9) of etching mask 44 (which is also the top width of acoustic hole 42) may be designed, so that the bottom width W2 of acoustic hole 42 is in a selected range. The bottom width W2 is small, so that the air leakage through acoustic hole 42 is minimized, and signal loss is also minimized. In accordance with some embodiments, bottom width W2 may be in the range between about 1,000 Å and about 10,000 Å. Therefore, by adopting the etching process to etch along point defect sites, the top width W1 of etching mask 44 do not have to be too small, while small bottom width W2 can still be resulted. The etching process is easier. For example, the upper portions of acoustic hole 42 may be larger, and it is easier for the etching chemical to enter acoustic hole 42, making the etching more efficient.

In above-discussed etching of AlScN layers 24, the etching is performed through wet etching, and the anisotropic etching effect is generated utilizing the lattice structures and the pointed defect sites. In accordance with alternative embodiments, AlScN layers 24 are etched in an anisotropic etching process through dry etching, and bias power and bias voltage is applied to generate the anisotropic effect. Corresponding, the sidewalls of AlScN layers 24 may be more vertical than if wet etching is used.

Further referring to FIG. 9, acoustic hole 42 is spaced apart from the closest edges of electrodes 26-1, 26-2, and 26-3 by spacings S1, S2, and S3. Spacings S1, S2, and S3 cannot be too big, otherwise, the device performance is degraded due to the significant reduction in the size of electrodes 26-1, 26-2, and 26-3. Spacings S1, S2, and S3 cannot be too small also. Otherwise, when process variation occurs, electrodes 26-1, 26-2, and 26-3 may be exposed to acoustic hole 42. In accordance with some embodiments, spacings S1, S2, and S3 are smaller than about 16,600 Å, and may be in the range between about 3,300 Å and about 16,600 Å.

In accordance with some embodiments, the edges of electrodes 26-1, 26-2, and 26-3 facing acoustic hole 42 are vertically aligned. In accordance with alternative embodiments, the edges of electrode 26-2 extend more toward the vertical middle line 42C of through-hole 42 than the overlying electrode 26-3, and/or the edges of electrode 26-1 extend more toward the vertical middle line 42C of through-hole 42 than the overlying electrode 26-2. Alternatively stated, the openings 32-1 (FIG. 3), 32-2 (FIG. 4), and 32-3 (FIG. 5, also refer to FIG. 20) may be increasingly larger.

FIG. 20 illustrates a top view of an example acoustic hole 42. In accordance with some embodiments, the acoustic hole 42 has a "X" shape, while other shapes may be adopted. The spacings S1, S2, and S3 between acoustic hole 42 and the closest edges of electrodes 26-1, 26-2, and 26-3 are marked. Spacings S1, S2, and S3 from different parts of acoustic hole 42 to the corresponding nearest edge of electrodes 26-1, 26-2, and 26-3 may be uniform. Sidewalls 26SW represent the sidewalls of electrodes 26-1, 26-2, and 26-3, wherein the sidewall of each of electrodes 26-1, 26-2, and 26-3 forms a full ring encircling acoustic hole 42.

Figure 10:
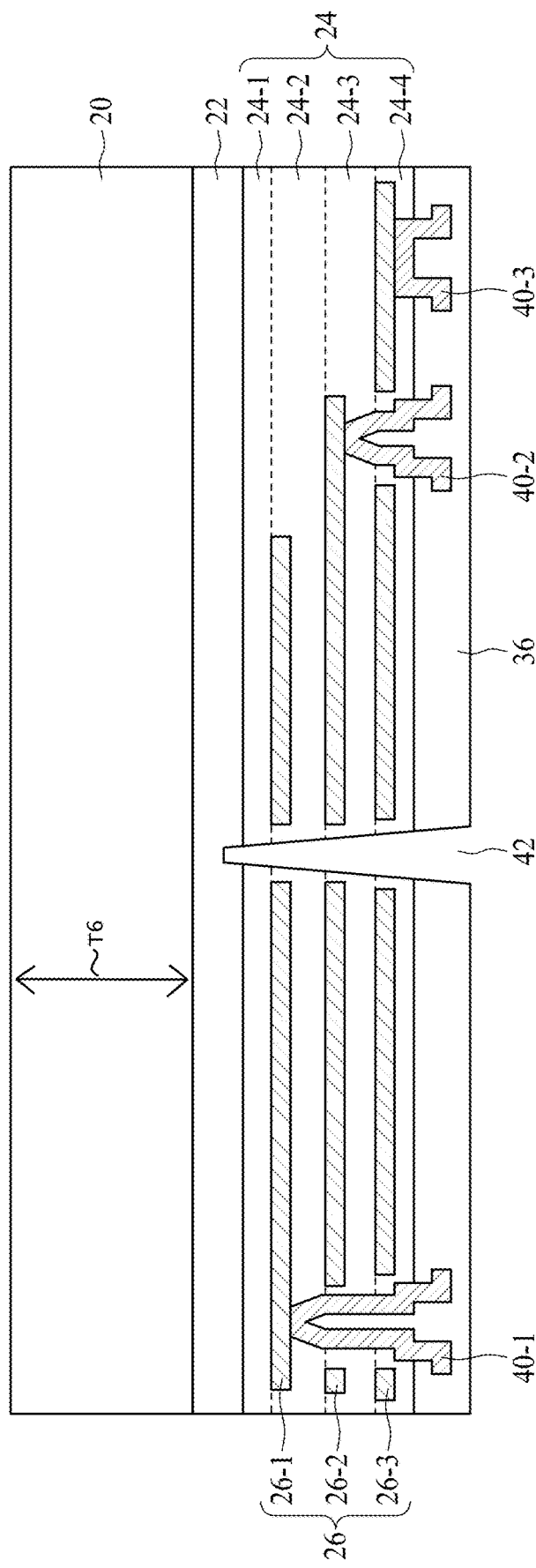
Figure 11:
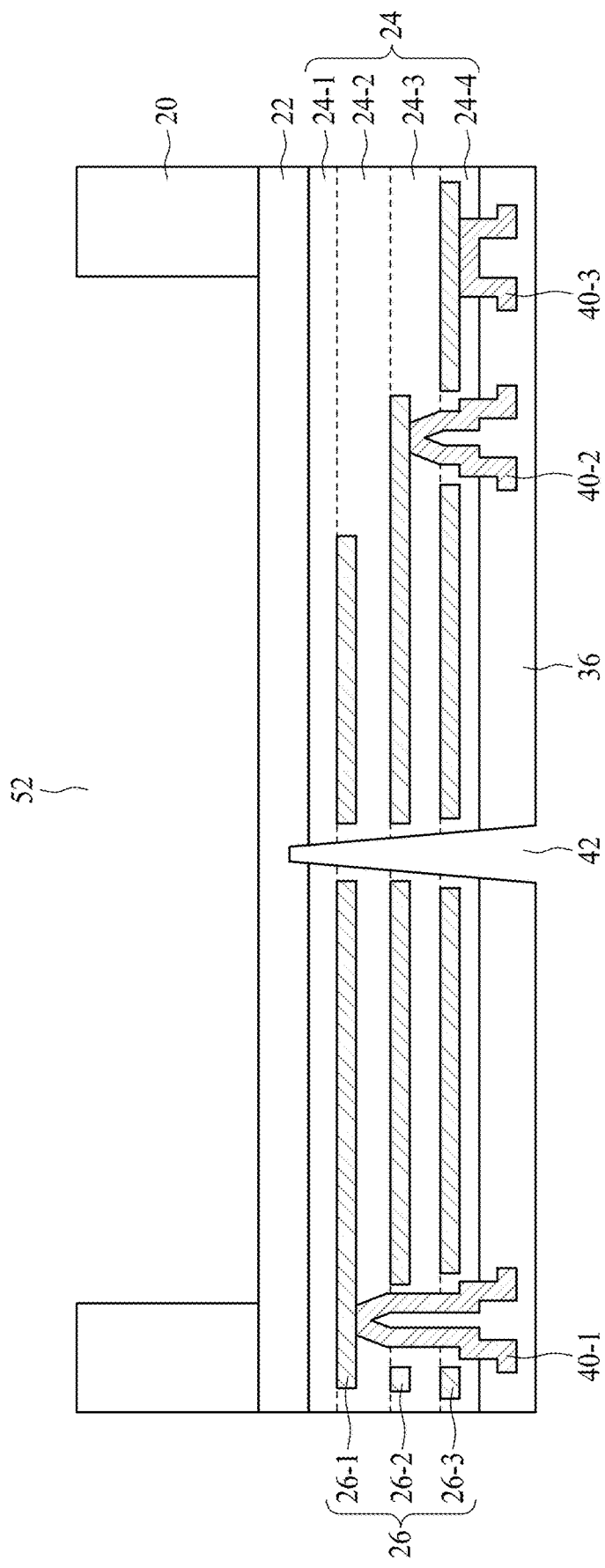

Referring to FIG. 10, a backside grinding process is performed on supporting substrate 20. The respective process is illustrated as process 232 in the process flow 200 as shown in FIG. 21. For example, the thickness T6 of supporting substrate 20 may be reduced to a range between about 200 μm and about 500 μm. Next, as shown in FIG. 11, supporting substrate 20 is etched to form cavity 52. The etching may be performed through a wet etching process or a dry etching process, and the etching process may be anisotropic or isotropic etching. The etching of supporting substrate 20 may be performed using layer 22 as an etch stop layer. In accordance with some embodiments, the etching may be performed using KOH as an etching chemical.

Figure 12:
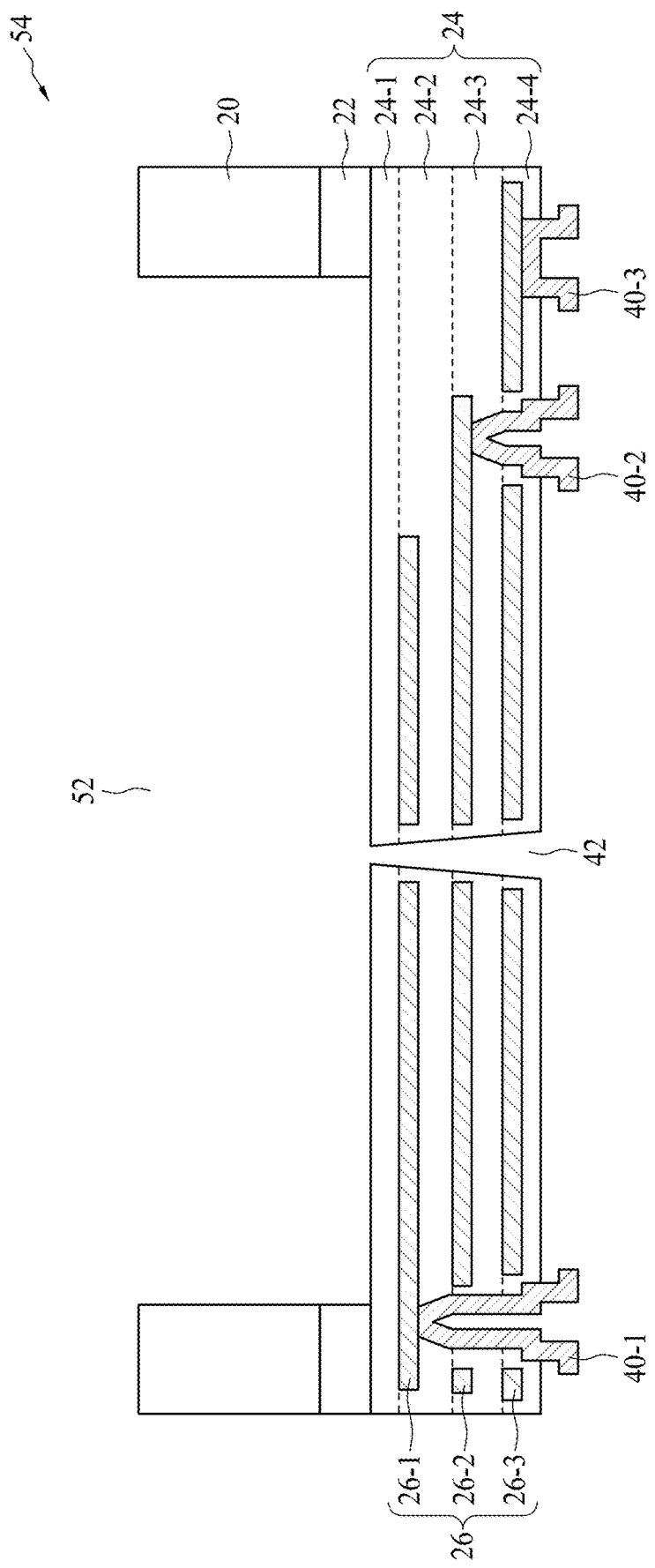

The exposed portion of layer 22 is then removed to extend cavity 52 through layer 22. The resulting structure is shown in FIG. 12. In accordance with some embodiments, the etching process may be performed using HF vapor as the etching gas. The acoustic hole 42 is thus exposed to and joined with cavity 52. MEMS device 54 is thus formed. The respective process is illustrated as process 234 in the process flow 200 as shown in FIG. 21. In accordance with some embodiments, MEMS device 54 may be used as a microphone. Sacrificial layer 36 (FIG. 11) is then removed to reveal contact plugs 40-1, 40-2, and 40-3.

Figure 13:
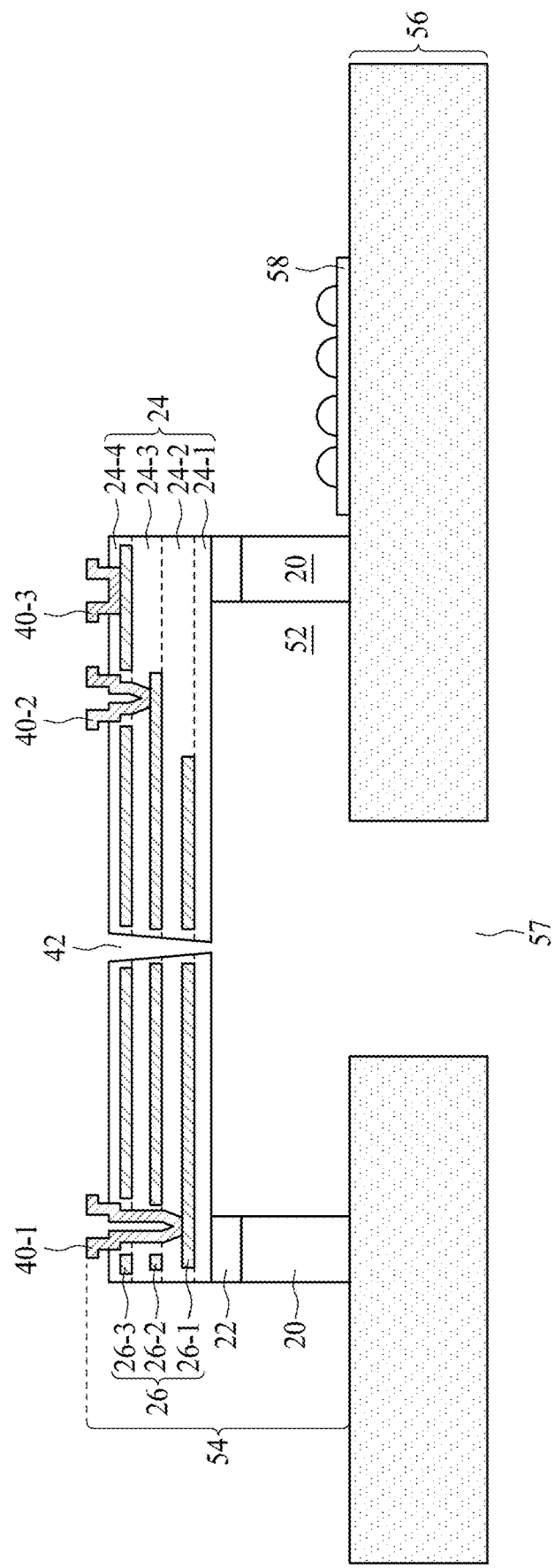

FIG. 13 illustrates the attachment of MEMS device 54 to package component 56 in accordance with some embodiments. The respective process is illustrated as process 236 in the process flow 200 as shown in FIG. 21. Package component 56 may comprise a printed circuit board, a package, a package substrate, or the like. In accordance with some embodiments, MEMS device 54 is attached to package component 56 through an adhesive film (not shown). In addition, device die 58 may also be attached to package component 56, for example, through a die-attach film (not shown). Device die 58 may include the circuits for receiving and processing the signals from MEMS device 54. Package component 56 includes through-hole 57, which is joined to and vertically aligned with acoustic hole 42 and cavity 52.

Figure 14:
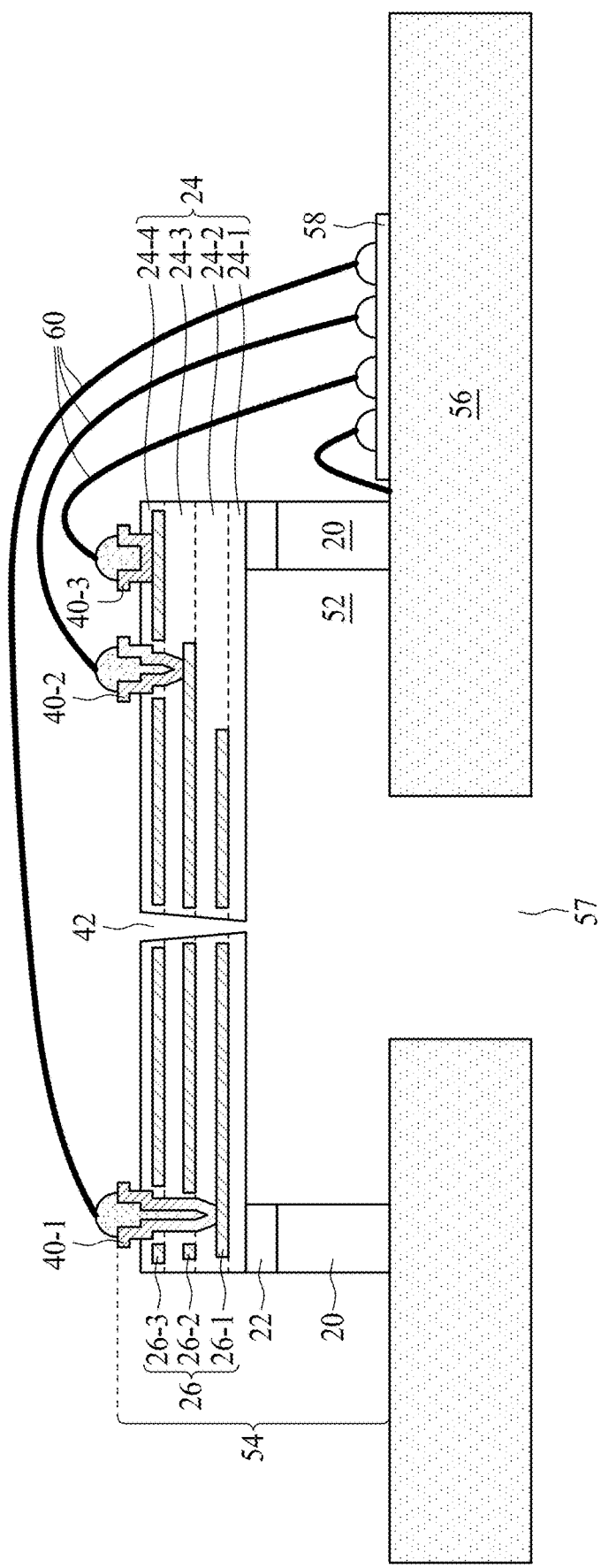

FIG. 14 illustrates the formation of electrical connections 60 for connecting MEMS device 54 to device die 58. The respective process is illustrated as process 238 in the process flow 200 as shown in FIG. 21. Electrical connections 60 may be formed through soldering, wire bonding, or the like. Accordingly, electrical connections 60 may include bond wires, solder regions, bond balls, and/or the like.

Figure 15:
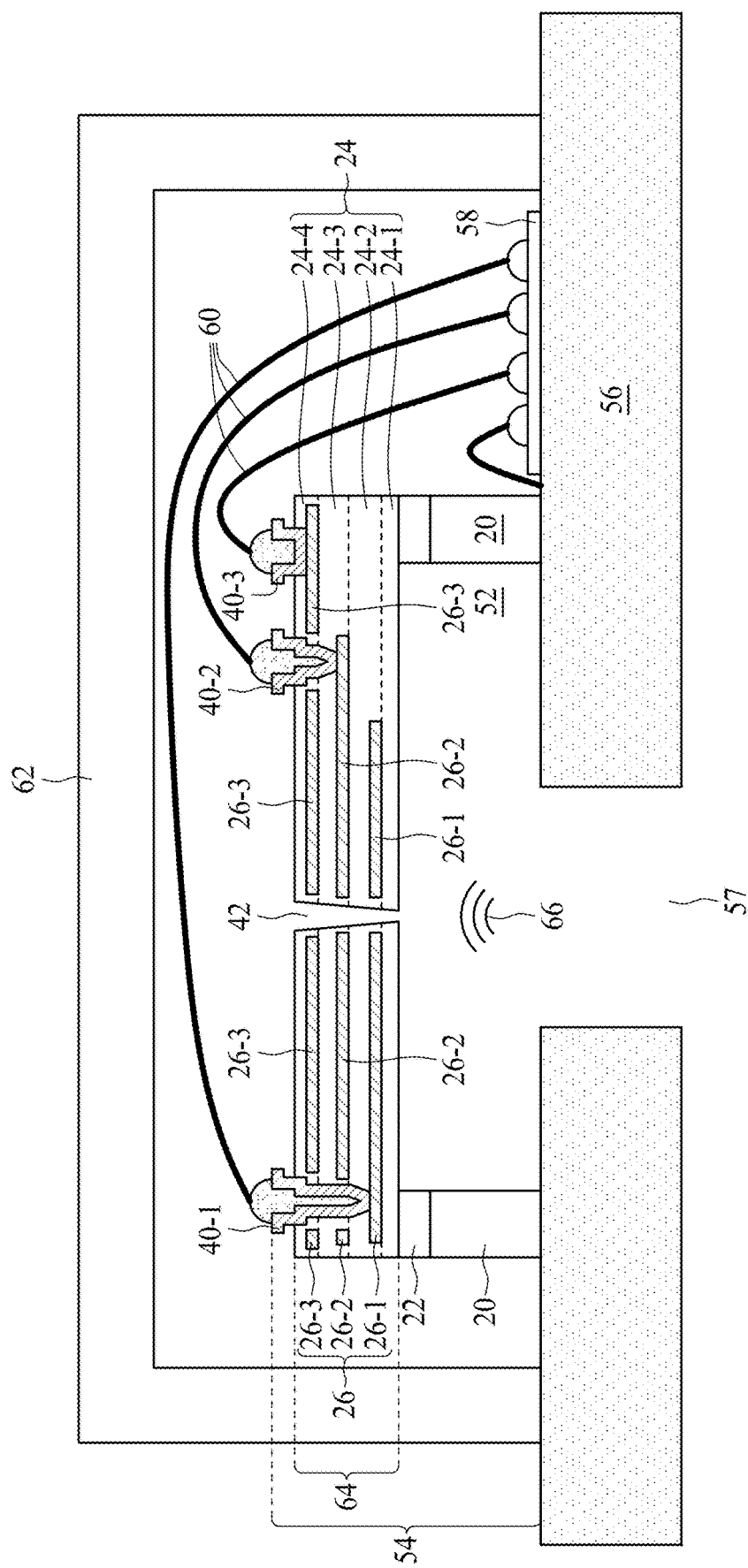

FIG. 15 illustrates the attachment of lid 62 to cover and protect MEMS device 54 and electrical connections 60. The respective process is illustrated as process 240 in the process flow 200 as shown in FIG. 21.

In the MEMS device 54, electrodes 26 and AlScN layers 24 in combination form piezoelectric membrane 64. Electrodes 26-1, 26-2, and 26-3 act as a bottom electrode, a middle electrode, and a top electrode, respectively. The middle electrode 26-2 may be electrically grounded. During the operation of MEMS device 54, a force (e.g., a pressure from an incident sound wave 66) may be applied to the piezoelectric membrane 64. The force causes voltages to be generated by piezoelectric layers (AlScN layers) 24. The voltages are picked up by contact plugs 40-1, 40-2, and 40-3, and are transferred to the circuit in device die 58. Device die 58 may include digital signal processors, which may convert the voltages into digital signals.

Figure 18:
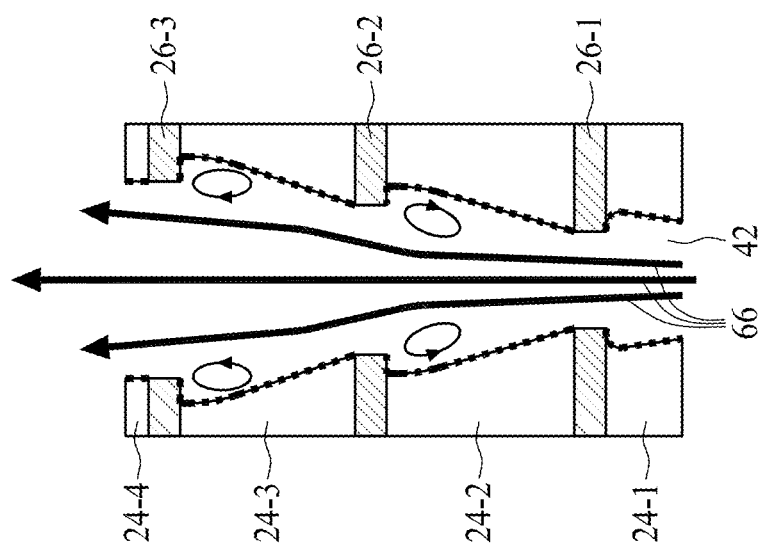

It is appreciated that by pre-patterning electrodes 26-1, 26-2, and 26-3 before the etching of AlScN layers 24 for forming acoustic hole 42, no electrodes 26-1, 26-2, and 26-3 will be exposed through acoustic hole 42. FIG. 18 illustrates an example showing what will happen if electrodes 26-1, 26-2, and 26-3 are exposed. For example, if electrodes 26-1, 26-2, and 26-3 are patterned in the same process for etching AlScN layers 24, due to the difference in the etching rates of AlScN layers 24 and electrodes 26-1, 26-2, and 26-3, the sidewalls of acoustic hole 42 will not be smooth, as shown in in FIG. 18. When sound wave 66 passes through acoustic hole 42, turbulence flow will be generated, resulting in signal noise and signal loss. In addition, due to the difference in the etching rates of AlScN layers 24 and electrodes 26-1, 26-2, and 26-3, it is difficult to control etching process, and it is difficult to control the width of acoustic hole 42.

As a comparison, as shown in FIG. 19, since electrodes 26-1, 26-2, and 26-3 are pre-patterned, in the formation of acoustic hole 42, it is easier to control the etching of the homogeneous AlScN layers 24, and the sidewalls 42SW of acoustic hole 42 are straight and smooth. The turbulence flow and signal noise caused by sound wave 66 are thus either eliminated or reduced.

The embodiments of the present disclosure have some advantageous features. By pre-patterning the electrodes so that the electrodes will not interfere with the etching of piezoelectric layers, the acoustic hole has smooth sidewalls, and the signal noise and signal loss is low. Also, it is possible to etch the piezoelectric layers through wet etching and generate slanted sidewalls with fixed tilt angles, so that the size of the acoustic hole is reduced, and the air leakage and signal loss are further reduced.

In accordance with some embodiments of the present disclosure, a method includes forming a membrane comprising depositing a first piezoelectrical layer; depositing a first electrode layer over the first piezoelectrical layer; patterning the first electrode layer to form a first electrode; depositing a second piezoelectrical layer over the first electrode; depositing a second electrode layer over the second piezoelectrical layer; patterning the second electrode layer to form a second electrode; and depositing a third piezoelectrical layer over the second electrode; etching the third piezoelectrical layer, the second piezoelectrical layer, and the first piezoelectrical layer to form a through-hole, wherein the through-hole is laterally spaced apart from the first electrode and the second electrode; and forming a first contact plug and a second contact plug electrically connecting to the first electrode and the second electrode, respectively.

In an embodiment, the third piezoelectrical layer, the second piezoelectrical layer, and the first piezoelectrical layer are etched through a wet etching process. In an embodiment, the wet etching process is performed using a phosphoric acid solution. In an embodiment, the wet etching process is performed to cause the through-hole to have straight and slanted sidewalls. In an embodiment, the first piezoelectrical layer, the second piezoelectrical layer, and the third piezoelectrical layer have a single crystalline structure. In an embodiment, the first electrode layer and the second piezoelectrical layer are deposited through epitaxy.

In an embodiment, the method further comprises depositing a third electrode layer over the third piezoelectrical layer; patterning the third electrode layer to form a third electrode; and forming a third contact plug electrically connecting to the third electrode, wherein the second electrode is electrically grounded. In an embodiment, the method further comprises attaching the membrane to a package component, wherein the package component comprises an additional through-hole, and wherein the additional through-hole is aligned to the through-hole.

In accordance with some embodiments of the present disclosure, a structure comprises a membrane comprising a first piezoelectrical layer; a first electrode over the first piezoelectrical layer; a second piezoelectrical layer over the first electrode; a second electrode over the second piezoelectrical layer; and a third piezoelectrical layer over the second electrode; and a through-hole penetrating through the first piezoelectrical layer, the second piezoelectrical layer, and the third piezoelectrical layer, wherein the through-hole is laterally spaced apart from the first electrode and the second electrode. In an embodiment, each of the first electrode and the second electrode comprises an edge forming a fully ring, and wherein all parts of the fully ring are spaced apart from respective nearest parts of the through-hole. In an embodiment, the edge encircles an X-shaped region therein.

In an embodiment, the first piezoelectrical layer, the second piezoelectrical layer, and the third piezoelectrical layer are continuously joined together to form a continuous layer without distinguishable interface in between. In an embodiment, the first piezoelectrical layer, the second piezoelectrical layer, and the third piezoelectrical layer have a crystalline structure. In an embodiment, the crystalline structure is a single-crystalline structure. In an embodiment, the through-hole has a straight edge extending from top to a bottom of the through-hole. In an embodiment, the straight edge forms a tilt angle with a major bottom surface of the membrane, and wherein the tilt angle is in a range between about 57 degrees and about 63 degrees.

In accordance with some embodiments of the present disclosure, a structure comprises a membrane comprising a piezoelectrical layer; a first electrode embedded in the piezoelectrical layer; a second electrode embedded in the piezoelectrical layer, wherein the second electrode is over the first electrode; and a third electrode embedded in the piezoelectrical layer, wherein the third electrode is over the second electrode; and a through-hole penetrating through the piezoelectrical layer, wherein the first electrode, the second electrode, and the third electrode comprise edges facing the through-hole, and the edges are in contacting with the piezoelectrical layer. In an embodiment, the piezoelectrical layer has a single-crystalline structure. In an embodiment, the through-hole has a straight edge extending from a top surface to a bottom surface of the piezoelectrical layer, and wherein the straight edge forms a tilt angle with a major bottom surface of the membrane, and wherein the tilt angle is in a range between about 57 degrees and about 63 degrees. In an embodiment, the piezoelectrical layer comprises AlScN.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    forming a membrane comprising:
        depositing a first piezoelectrical layer;
        depositing a first electrode layer over the first piezoelectrical layer;
        patterning the first electrode layer to form a first electrode;
        depositing a second piezoelectrical layer over the first electrode;
        depositing a second electrode layer over the second piezoelectrical layer;
        patterning the second electrode layer to form a second electrode; and
        depositing a third piezoelectrical layer over the second electrode, wherein the first piezoelectrical layer, the second piezoelectrical layer, and the third piezoelectrical layer have a single crystalline structure;
    etching the third piezoelectrical layer, the second piezoelectrical layer, and the first piezoelectrical layer to form a through-hole, wherein the through-hole is laterally spaced apart from the first electrode and the second electrode; and
    forming a first contact plug and a second contact plug electrically connecting to the first electrode and the second electrode, respectively.

2. The method of claim 1, wherein the third piezoelectrical layer, the second piezoelectrical layer, and the first piezoelectrical layer are etched through a wet etching process.

3. The method of claim 2, wherein the wet etching process is performed using a phosphoric acid solution.

4. The method of claim 2, wherein the wet etching process is performed to cause the through-hole to have straight and slanted sidewalls.

5. The method of claim 1, wherein the first electrode layer and the second piezoelectrical layer are deposited through epitaxy.

6. The method of claim 1 further comprising:
    depositing a third electrode layer over the third piezoelectrical layer;
    patterning the third electrode layer to form a third electrode; and
    forming a third contact plug electrically connecting to the third electrode, wherein the second electrode is electrically grounded.

7. The method of claim 1 further comprising attaching the membrane to a package component, wherein the package component comprises an additional through-hole, and wherein the additional through-hole is aligned to the through-hole.

8. A method comprising:
    forming a membrane comprising:
        forming a first piezoelectrical layer;
        forming a first electrode over the first piezoelectrical layer;
        forming a second piezoelectrical layer over the first electrode;
        forming a second electrode over the second piezoelectrical layer; and
        forming a third piezoelectrical layer over the second electrode; and
    performing an etching process to form a through-hole penetrating through the first piezoelectrical layer, the second piezoelectrical layer, and the third piezoelectrical layer, wherein the through-hole is laterally spaced apart from the first electrode and the second electrode by remaining portions of the first piezoelectrical layer, the second piezoelectrical layer, and the third piezoelectrical layer.

9. The method of claim 8, wherein each of the first electrode and the second electrode comprises an edge forming a fully ring, and wherein all parts of the fully ring are spaced apart from respective nearest parts of the through-hole.

10. The method of claim 9, wherein the edge encircles an X-shaped region therein.

11. The method of claim 8, wherein at a time the etching process is performed, the first piezoelectrical layer, the second piezoelectrical layer, and the third piezoelectrical layer are continuously joined together to form a continuous layer without distinguishable interface in between.

12. The method of claim 8, wherein the first piezoelectrical layer, the second piezoelectrical layer, and the third piezoelectrical layer are formed as having crystalline structures.

13. The method of claim 12, wherein the crystalline structures are single-crystalline structures.

14. The method of claim 8, wherein the through-hole has a straight edge extending from top to a bottom of the through-hole, and wherein the straight edge comprises edges of the first piezoelectrical layer, the second piezoelectrical layer, and the third piezoelectrical layer.

15. The method of claim 14, wherein the straight edge forms a tilt angle with a major bottom surface of the membrane, and wherein the tilt angle is in a range between about 57 degrees and about 63 degrees.

16. A method comprising:
　forming a membrane comprising:
　　forming a piezoelectrical layer;
　　forming a first electrode embedded in the piezoelectrical layer;
　　forming a second electrode embedded in the piezoelectrical layer, wherein the second electrode is over the first electrode; and
　　forming a third electrode embedded in the piezoelectrical layer, wherein the third electrode is over the second electrode; and
　forming a through-hole penetrating through the piezoelectrical layer, wherein the first electrode, the second electrode, and the third electrode comprise edges facing the through-hole, and the edges are in contacting with the piezoelectrical layer.

17. The method of claim 16, wherein the piezoelectrical layer has a single-crystalline structure.

18. The method of claim 16, wherein the through-hole has a straight edge extending from a top surface to a bottom surface of the piezoelectrical layer, and wherein the straight edge forms a tilt angle with a major bottom surface of the membrane, and wherein the tilt angle is in a range between about 57 degrees and about 63 degrees.

19. The method of claim 16, wherein the piezoelectrical layer comprises AlScN.

\* \* \* \* \*